US007849225B2

(12) United States Patent
Schofield et al.

(10) Patent No.: US 7,849,225 B2
(45) Date of Patent: Dec. 7, 2010

(54) SYSTEM, DEVICE, AND METHOD FOR MANAGING COMMUNICATION SERVICES IN AN OPTICAL COMMUNICATION SYSTEM

(75) Inventors: Bruce A. Schofield, Tyngsboro, MA (US); William R. Hawe, Hollis, NH (US); Paul D. Callahan, Carlisle, MA (US); Indermohan S. Monga, Lexington, MA (US); Stephen Suryaputra, Malden, MA (US); Andre N. Fredette, Groton, MA (US)

(73) Assignee: Ciena Corporation, Linthicum, MD (US)

( * ) Notice: Subject to any disclaimer, the term of this patent is extended or adjusted under 35 U.S.C. 154(b) by 809 days.

(21) Appl. No.: 09/930,119

(22) Filed: Aug. 15, 2001

(65) Prior Publication Data

US 2003/0212829 A1 Nov. 13, 2003

Related U.S. Application Data

(60) Provisional application No. 60/225,335, filed on Aug. 15, 2000.

(51) Int. Cl.
*G06F 15/16* (2006.01)
(52) U.S. Cl. .................... 709/250; 709/217; 709/220; 709/223; 709/224; 709/227; 709/228; 709/229; 709/230; 709/231; 370/386; 370/387; 370/388; 370/389; 370/395.21
(58) Field of Classification Search ......... 709/201–203, 709/223–226, 232, 238, 104, 250, 217–220, 709/227–231, 239; 370/352, 395.1, 465, 370/270, 386–389, 395.21; 707/102–104.1, 707/103 R; 718/104
See application file for complete search history.

(56) References Cited

U.S. PATENT DOCUMENTS 5,138,615 A * 8/1992 Lamport et al. ............. 370/400
5,774,669 A * 6/1998 George et al. ............... 709/224
5,812,764 A * 9/1998 Heinz, Sr. ...................... 726/5

(Continued)

FOREIGN PATENT DOCUMENTS

EP 0282071 9/1988

(Continued)

OTHER PUBLICATIONS

"Simple Wavelength Assignment Protocol", Stephen Suryaputra, et al., Oct. 26, 1999.

(Continued)

*Primary Examiner*—Alina N. Boutah
(74) *Attorney, Agent, or Firm*—Christopher & Weisberg, P.A.

(57) ABSTRACT

A system, device, and method for managing communication services in an optical communication system utilizes a optical service agent (OSA) that operates within the domain of the network user and manages various communication services on behalf of the network user. The OSA interacts with the optical communication network to obtain various communication services and manages those communication services for the network user based upon predetermined parameters defined by the network user. An authenticated auto-discovery mechanism is used to automatically identify and authenticate OSA-enabled users and to distribute information between peer OSA-enabled users. A peer-to-peer signaling mechanism is used to extend OSA functionality to OSA-enabled users that do not interface directly with the optical communication network.

38 Claims, 23 Drawing Sheets

U.S. PATENT DOCUMENTS

| | | | | |
|---|---|---|---|---|
| 5,889,600 | A * | 3/1999 | McGuire | 398/50 |
| 5,903,370 | A * | 5/1999 | Johnson | 398/4 |
| 5,905,715 | A * | 5/1999 | Azarmi et al. | 370/244 |
| 5,999,179 | A * | 12/1999 | Kekic et al. | 715/734 |
| 6,006,342 | A * | 12/1999 | Beardsley et al. | 714/5 |
| 6,016,211 | A | 1/2000 | Szymanski et al. | |
| 6,097,722 | A * | 8/2000 | Graham et al. | 370/395.21 |
| 6,119,234 | A * | 9/2000 | Aziz et al. | 726/11 |
| 6,185,612 | B1 * | 2/2001 | Jensen et al. | 709/223 |
| 6,226,273 | B1 * | 5/2001 | Busuioc et al. | 370/270 |
| 6,636,505 | B1 * | 10/2003 | Wang et al. | 370/352 |
| 6,681,232 | B1 * | 1/2004 | Sistanizadeh et al. | 707/104.1 |
| 6,690,848 | B2 * | 2/2004 | Graves et al. | 385/16 |
| 6,728,484 | B1 * | 4/2004 | Ghani | 398/42 |
| 6,876,668 | B1 * | 4/2005 | Chawla et al. | 370/468 |
| 6,920,287 | B1 * | 7/2005 | Hinds et al. | 398/9 |
| 6,999,459 | B1 * | 2/2006 | Callon et al. | 370/400 |
| 7,046,662 | B1 * | 5/2006 | Saluja et al. | 370/389 |
| 7,095,956 | B2 * | 8/2006 | Levandovsky et al. | 398/27 |
| 7,110,670 | B1 * | 9/2006 | Au et al. | 398/48 |
| 7,133,403 | B1 * | 11/2006 | Mo et al. | 370/390 |
| 7,295,566 | B1 * | 11/2007 | Chiu et al. | 370/419 |
| 7,321,932 | B1 * | 1/2008 | Monga et al. | 709/227 |
| 2001/0033551 | A1 * | 10/2001 | Busuioc et al. | 370/270 |
| 2002/0063915 | A1 * | 5/2002 | Levandovsky et al. | 359/110 |
| 2002/0156914 | A1 * | 10/2002 | Lo et al. | 709/238 |
| 2003/0016672 | A1 * | 1/2003 | Rosen et al. | 370/392 |
| 2003/0058804 | A1 * | 3/2003 | Saleh et al. | 370/254 |

FOREIGN PATENT DOCUMENTS

| | | |
|---|---|---|
| EP | 0 909 058 B1 | 11/2005 |
| WO | WO 9513687 | 5/1995 |
| WO | WO 9831184 | 7/1998 |
| WO | WO 0004667 | 1/2000 |

OTHER PUBLICATIONS

"Work on the Automatic Switched Optical Network", Contribution to T1 Standards Project—T1X1.5, Newsome, et. al., Jan. 2000.

Memo: "MPLS Control Plane for Switched Optical Networks", MPLS Working Group Internet Draft, Krishnaswamy, et, al., Feb. 2000.

Memo: "IP Over Optical Networks: A Summary of Issues" Internet Draft, N. Chandhok, et al., Jul. 2000.

"Architecture for the Automatic Switched Optical Network" First Draft of G.ason, Mayer, Sep. 13-15, 2000.

"Controlling Optical Data Networks with an Application Specific routing Protocol", Cisco Systems, Inc., 2000.

Memo: "Generalized MPLS—Signaling Functional Description" Ashwood- Smith, Network Working Group Internet Draft, Jul. 2001.

"ASON—Requirements at the Client API", Newsome, et. al., Sep. 2000.

"Automatically Switched Optical Networks (ASON)", Nortel Networks Limited, Jun. 2000.

"MPLS: A Progress Report", Peter Ashwood-Smith, et al., Nov. 1, 1999, URL: http://www.networkmagazine.com/article/NMG20000426S0015.

Strand, "Optical Layer Services Framework", Optical Internetworking Forum, 1998, pp. 1-10.

Michael Mayer, First Draft of G.ason "Architecture for the Automatic Switched Optical Network" (ASON), Standards Project: Digital Optical Hierachy. Mar. 2000, pp. 1-14.

Tsaoussidis, et al. "Network Management and Operations: Application Oriented Management in Distributed Environments", IEEE, 1998, pp. 130-134.

Zibman, et al. "An Architectural Approach to Minimizing Feature Interactions in Telecommunications", IBEB/ACM Transactions of Networking, vol. 4, No. 4, Autugst 1996, pp. 582-596.

Wei, et al., "Network Conrol and Management of a Reconfigurable WDM Network", IEEE 1996, pp. 581-586.

Strand, "Optical Layer Services Framework", Optical Internetworking Forum, 1998, pp. 1-10.

Castellano et al, "Optical Switching System for MPP, LAN, WAN Systems", IEEE Pacific Rim Conference , 1997, pp. 260-264.

* cited by examiner

FIG 1    100

FIG. 8    810

SYSTEM, DEVICE, AND METHOD FOR MANAGING COMMUNICATION SERVICES IN AN OPTICAL COMMUNICATION SYSTEM

PRIORITY

The present application claims priority from the following commonly-owned United States patent application, which is hereby incorporated herein by reference in its entirety:

U.S. Provisional Patent Application No. 60/225,335 entitled OPTICAL SERVICE AGENT, which was filed on Aug. 15, 2000 in the names of Bruce A. Schofield, William R. Hawe, Paul D. Callahan, Indermohan Monga, Stephen Suryaputra, and Andre N. Fredette.

CROSS-REFERENCE TO RELATED APPLICATION(S)

The present application may be related to the following commonly owned United States patent applications, which are hereby incorporated herein by reference in their entireties:

U.S. patent application Ser. No. 09/931,643 entitled OPTICAL SWITCH ROUTER, now issued as US 7,283,747, which was filed on even date herewith in the names of Bruce A. Schofield, James V. Luciani, and Michael J. Craren;

U.S. patent application Ser. No. 09/931,645 entitled SYSTEM, DEVICE, AND METHOD FOR MANAGING CONNECTION ESTABLISHMENT AND RELATED SERVICES IN AN OPTICAL COMMUNICATION SYSTEM, now issued as U.S. Pat. No. 7,321,932, filed on even data herewith in the names of Indermohan S. Monga, Stephen Suryaputra, Vikram Ramachandran, and Bruce A. Schofield;

U.S. patent application Ser. No. 09/930,097 entitled SYSTEM, DEVICE, AND METHOD FOR BANDWIDTH MANAGEMENT IN AN OPTICAL COMMUNICATION SYSTEM, which was filed on even date herewith in the names of Indermohan S. Monga, Bruce A. Schofield, and Stephen Suryaputra;

U.S. patent application Ser. No. 09/930,095 entitled SYSTEM, DEVICE, AND METHOD FOR MANAGING CONNECTION QUALITY IN AN OPTICAL COMMUNICATION SYSTEM, which was filed on even date herewith in the name of Indermohan S. Monga;

U.S. patent application Ser. No. 09/930,375, now issued as U.S. Pat. No. 7,437,449, entitled SYSTEM, DEVICE, AND METHOD FOR MANAGING SERVICE LEVEL AGREEMENTS IN AN OPTICAL COMMUNICATION SYSTEM, which was filed on even date herewith in the names of Indermohan S. Monga, Bruce A. Schofield, and Rajesh Tyagi; and U.S. patent application Ser. No. 09/930,548 entitled SYSTEM, DEVICE, AND METHOD FOR MANAGING ALTERNATE SITE SWITCHING IN AN OPTICAL COMMUNICATION SYSTEM, which was filed on even date herewith in the names of Stephen Suryaputra, Indermohan S. Monga, Thomas P. Hardjono, and Bruce A. Schofield.

FIELD OF THE INVENTION

The present invention relates generally to optical networking, and more particularly to managing communication services in an optical communication system.

BACKGROUND OF THE INVENTION

In today's information age, communication networks are increasingly used for transferring information among a multitude of communication devices. As demand for communication services continues to grow, the demand on these communication networks for carrying increasing amounts of information at increasing speeds continues to grow. Therefore, communication networks are evolving to handle these increased demands.

One way in which communication networks are evolving is through the use of optical communication facilities. Optical communication facilities transport information over optical communication media (such as optical fibers). Such optical communication networks provide vast amounts of bandwidth over short and long distances.

The optical communication network is capable of providing various communication services to its users. Traditionally, such communication services have been very expensive, and need to be planned and scheduled well in advance. This is due in part because changes to the optical communication network, such as provisioning and switching optical communication paths, required substantial human intervention.

SUMMARY OF THE INVENTION

In accordance with one aspect of the invention, an optical service agent (OSA) operates within the domain of the network user and manages various communication services on behalf of the network user. The OSA interacts with the optical communication network to obtain various communication services and manages those communication services for the network user based upon predetermined parameters defined by the network user. The OSA can manage practically any communication service that can be handled manually.

In accordance with another aspect of the invention, an authenticated auto-discovery mechanism is used to automatically identify and authenticate OSA-enabled users and to distribute information between peer OSA-enabled users.

In accordance with yet another aspect of the invention, a peer-to-peer signaling mechanism is used to extend OSA functionality to OSA-enabled users that do not interface directly with the optical communication network.

Various aspects of the present invention can be applied to an agile transport network, such as an automatically switched optical/transport network (ASON/ASTN).

DETAILED DESCRIPTION OF A PREFERRED EMBODIMENT

In an embodiment of the present invention, an optical service agent (OSA) operating within the domain of the network user manages various communication services on behalf of the network user. The OSA interacts with the optical communication network to obtain various communication services and manages those communication services for the network user based upon predetermined parameters defined by the network user. In essence, then, the optical communication network provides a "core" set of communication services that can be accessed by the OSA, and the OSA provides advanced communication services for the network user using the "core" set of communication services provided by the optical communication network.

In an agile transport network, various optical communication services that heretofore have been performed manually are performed automatically by "intelligent" optical communication devices within the network. In particular, the optical internet infrastructure is evolving from a statically-provisioned SONET ring-based transport network to a more dynamically-provisioned mesh network.

One example of an agile transport network is an automatically switched optical/transport network (ASON or ASTN), which is described in the related application entitled SYSTEM AND DEVICE FOR PROVIDING COMMUNICATION SERVICES IN AN OPTICAL COMMUNICATION SYSTEM incorporated by reference above. The ASON typically includes optical cross-connect switches (OXCs) that are used to form the mesh network and optical channel controllers (OCCs) that dynamically create, delete, and modify optical communication paths by controlling the OXCs through a connection control interface (CCI). For convenience, the OXCs and OCCs are referred to hereinafter collectively as ASON devices. The ASON devices, and in particular the OCCs, are typically network routers that use a link-state routing protocol (e.g., OSPF) to distribute link attributes (such as optical channel availability) and a signaling protocol (e.g., MPLS or GMPLS) to manage optical communication paths end-to-end. These protocols enable the ASON to automatically and quickly create, delete, and modify optical communication paths. The ASON typically also includes an optical service server (OSS) for coordinating the various communication services provided by the ASON. Thus, the ASON provides more agility by moving from manual provisioning to automatic provisioning via switching and signaling.

In essence, then, the ASON is an optical/transport network that has dynamic connection capabilities. Among other things, the ASON provides for discovery of physical topology for optical elements, efficient use of available bandwidth by dynamic creation of optical communication paths, and end-to-end connection protection and restoration.

Figure 1:
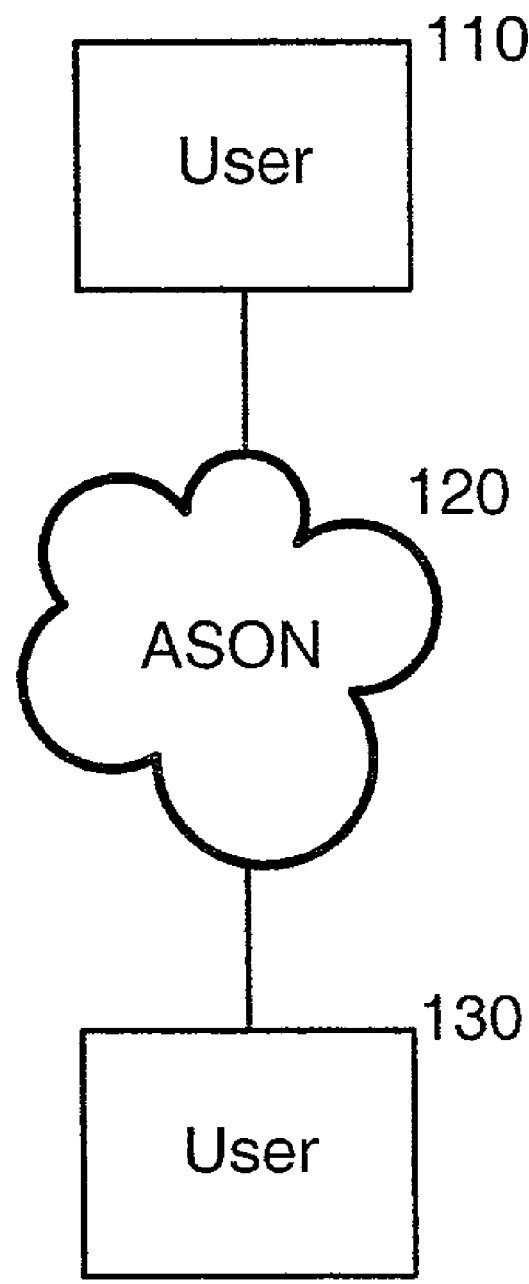
FIG. 1 is a network diagram showing a representation of a communication system in which users communicate over an automatically switched optical network (ASON) in accordance with an embodiment of the present invention.

FIG. 1 shows a representation of a communication system 100 in which two users 110, 130 communicate over an ASON 120. The users 110, 130 may be optical switch routers, as described in the related application entitled OPTICAL SWITCH ROUTER incorporated by reference above, that are positioned as edge nodes of their respective user networks for interfacing with the ASON 120. The ASON 120 provides various communication services to the users 110, 130 via the automatic servicing logic. Various ASON communication services are discussed in more detail below.

Each ASON device includes an ASON controller for supporting automated communication services within the ASON 120. Among other things, the ASON controller enables each ASON device to automatically provision, switch, and signal optical communication paths within the ASON 120. The ASON controller enables carriers and service providers to offer many value-added services to their customers.

In order for the users 110, 130 to control and monitor communication services from the ASON 120, the ASON controller provides a user-to-network interface (UNI) through which the users 110, 130 interact with the ASON controller for controlling and monitoring communication services within the ASON 120. Through the ASON UNI, the users 110, 130 can access various controllable features of the ASON 120. For example, using the ASON UNI, the users 110, 130 can request an optical communication path having certain attributes, renegotiate the attributes of the optical communication path, control switching of the optical communication path, terminate the optical communication path, and monitor operation of the ASON 120, to name but a few.

Within the ASON 120, each ASON device is able to perform various functions in support of the automated communication services. Some of these functions can be carried out by an individual ASON device, while others of these functions require coordination among multiple ASON devices. Therefore, the ASON controller provides a network-to-network interface (NNI) that enables communication between ASON devices for coordinating various communication functions. Through the ASON NNI, the various ASON devices can exchange ASON routing information and coordinate such things as establishment and termination of optical communication paths, switching of optical communication paths, and protection and restoration of optical communication paths, to name but a few.

Figure 2:
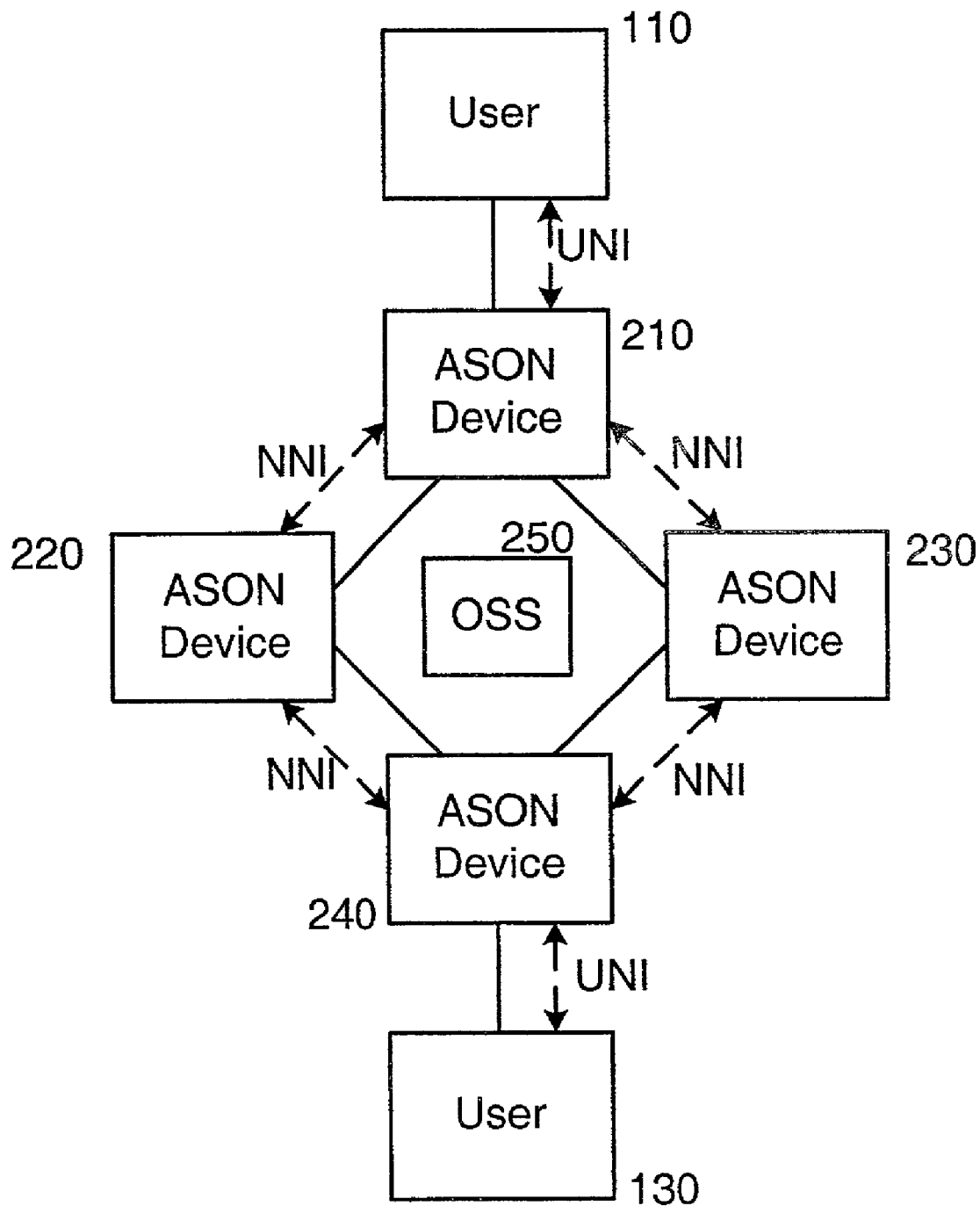
FIG. 2 is a network diagram showing an exemplary ASON in accordance with an embodiment of the present invention.

FIG. 2 shows an exemplary embodiment of the ASON 120 having four ASON devices 210, 220, 230, 240 and OSS 250. For convenience, the solid lines shown between the ASON devices 210-240 represent optical communication paths, which may be all-optical paths (lightpaths) or partially optical paths (switch-paths), and the dashed lines shown between the ASON devices 210-240 show the type of interface (UNI or NNI). The users 110, 130 interface with the ASON 120 through ASON device 210 and ASON device 240, respectively. The ASON devices 210, 240 provide a UNI to the users 110, 130, respectively, through which the users 110, 130 can control and monitor communication services provided by the ASON 120, and more specifically by the ASON controller within the ASON devices 210-240. The ASON devices 210-240 are interconnected via the NNI, and use the NNI to interoperate for coordinating various communication functions. It should be noted that the ASON NNI may utilize separate communication paths from the optical communication paths. The OSS 250 coordinates the various communication services provided by the ASON devices 210-240.

At the heart of the various automated communication services is automatic switching of optical communication paths. In order to support automatic switching of optical communication paths within the ASON 120, the ASON devices 210-240 typically include some form of optical switching logic, such as an optical/photonic switching fabric, for performing optical/photonic switching of optical communication paths. The optical switching fabric may be based upon any of a variety of optical/photonic switching technologies, including, but not limited to, Micro Electro Mechanical System (MEMS) technology, Micro Opto Electro Mechanical System (MOEMS) technology, lithium niobate technology, liquid crystal technology, or other optical/photonic switching technology. The optical switching logic can be dynamically configured under control of the ASON controller for such things as passing optical data streams from a number of incoming optical fibers to a number of outgoing optical fibers (i.e., switching), adding an optical data stream to an outgoing optical fiber, and dropping an optical data stream from an incoming optical fiber for local processing by the ASON device, to name but a few.

Figure 3:
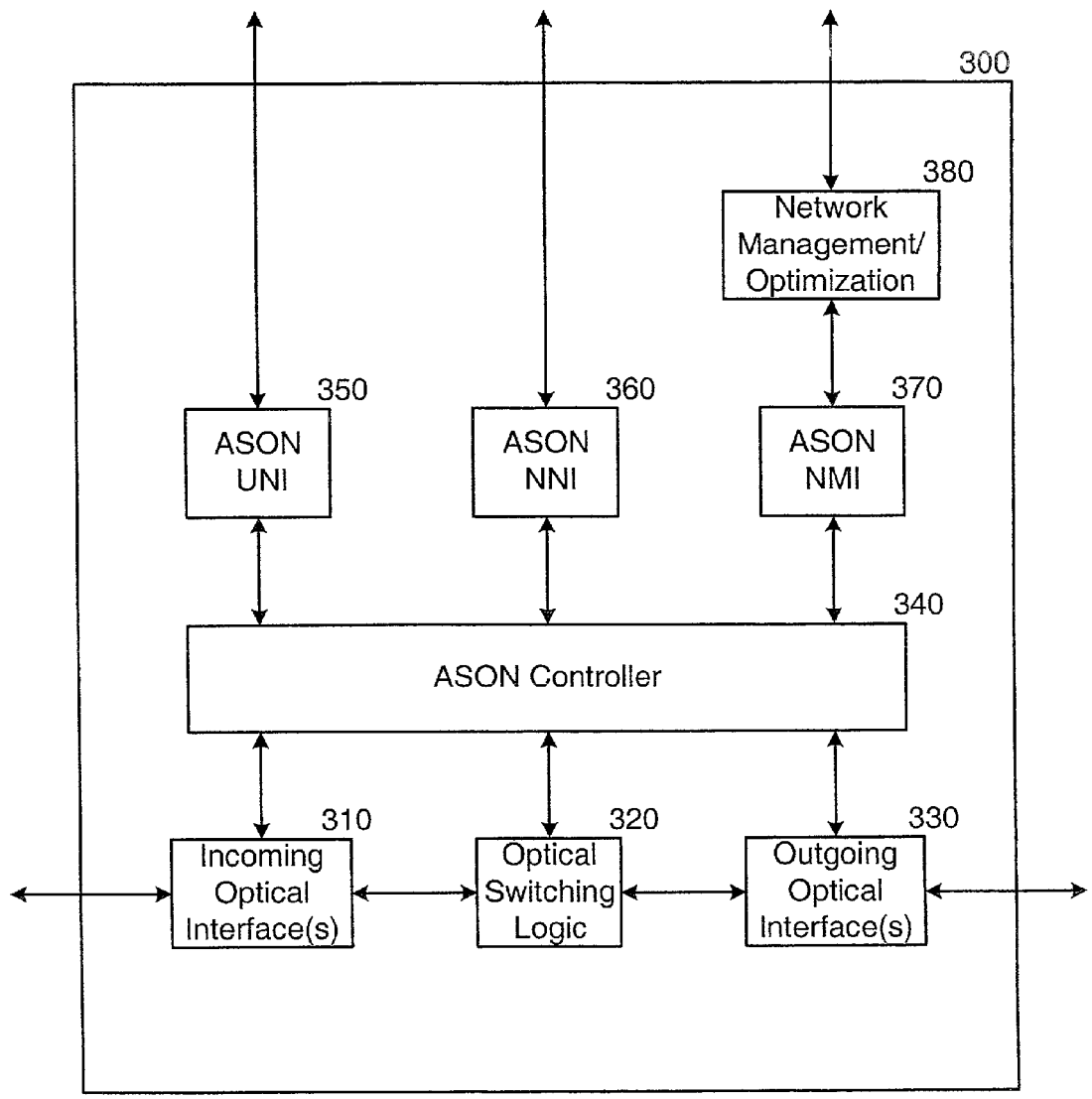
FIG. 3 is a block diagram showing relevant components of an exemplary ASON device in accordance with an embodiment of the present invention.

FIG. 3 shows the relevant components of an exemplary ASON device 300. Among other things, the ASON device 300 includes a number of incoming optical interfaces 310, a number of outgoing optical interfaces 330, optical switching logic 320, ASON controller 340, ASON UNI 350, ASON NNI 360, ASON Network Management Interface (NMI) 370, and network management/optimization elements 380. The incoming optical interface(s) 310 are couplable to a number of incoming optical fibers for receiving optical data streams at various wavelengths. The outgoing optical interface(s) 330 are couplable to a number of outgoing optical fibers for outputting optical data streams at various wavelengths. The optical switching logic 320 is interposed between the incoming optical interface(s) 310 and the outgoing optical interface(s) 330 for switching optical data streams, which may include such things as passing certain optical data streams received over the incoming optical interface(s) 310 through to the outgoing optical interface(s) 330, dropping one or more optical data streams received over the incoming optical interface(s) 310 for local processing by the ASON device 300, and adding one or more optical data streams to the outgoing optical interface(s) 330, to name but a few. The ASON controller 340 automates certain communication services by controlling, among other things, the incoming optical interface(s) 310, the optical switching logic 320, and the outgoing optical interface(s) 330. The ASON UNI 350 enables a user to control and monitor communication services provided by the ASON controller 340. The ASON NNI 360 enables the ASON controller 340 within the ASON device 300 to interact with the ASON controller in other ASON devices for coordinating communication services within the ASON 120. The ASON UNI 350 and the ASON NNI 360 are typically integral to the ASON controller 340, but are shown here separately for convenience. The ASON NMI 370 is a network management interface between the ASON controller 340 and various network management/optimization elements 380. Among other things, the ASON controller 340 provides network status information to the network management/optimization elements 380 and receives network updates from the network management/optimization elements 380 via the ASON NMI 370.

Without limitation, the ASON 120 can provide practically any communication service that has traditionally been performed manually. As described in the related application entitled SYSTEM AND DEVICE FOR PROVIDING COMMUNICATION SERVICES IN AN OPTICAL COMMUNICATION SYSTEM incorporated by reference above, some exemplary communication services that can be provided by the ASON 120 include "plug and play" for optical elements, modeling of optical communication paths, automatic provisioning of optical communication paths, user-requested switching of optical communication paths, automatic switching based upon service level agreement (SLA), automatic switching for protection and restoration, bandwidth management, and reporting of statistical and other information, to name but a few. It should be noted that the present invention is in no way limited to any particular communication services provided by the ASON 120.

As discussed above, the ASON UNI enables the users to control and monitor communication services provided by the ASON 120. The ASON UNI provides a standardized interface to the ASON 120, and more particularly to the ASON controller 340 in the ASON device. Conceptually, the ASON UNI provides a set of "control knobs" through which the users can control and monitor ASON communication services.

One way for a user to access ASON communication services is by implementing some or all of the ASON UNI functionality. For example, ASON UNI functionality can be integrated with a user application so that the user application can access ASON communication services. For convenience, such a user is referred to hereinafter as an ASON-enabled user, and such a user application is referred to hereinafter as an ASON-enabled user application.

Figure 4:
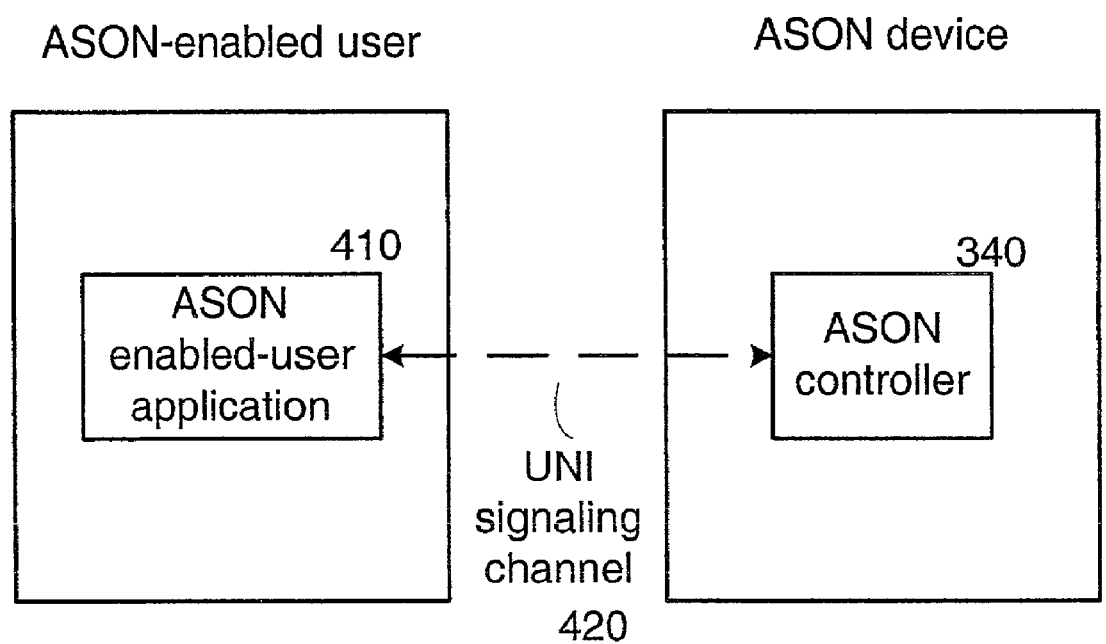
FIG. 4 is a block diagram showing an ASON-enabled user including an ASON-enabled user application in accordance with an embodiment of the present invention.

FIG. 4 shows an ASON-enabled user including an ASON-enabled user application 410. The ASON-enabled user application 410 implements some or all of the ASON UNI functionality. The ASON-enabled user application 410 communicates with the ASON controller 340 in the ASON device over a UNI signaling channel 420, using the ASON UNI in order to obtain communication services from the ASON 120. The UNI signaling channel 420 may be, for example, an in-band signal carried over a SONET Data Communication Channel (DCC).

Figure 5:
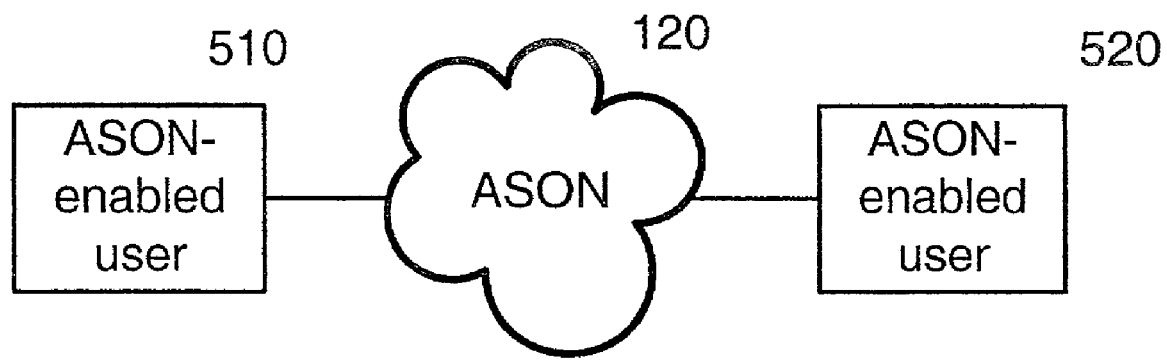
FIG. 5 is a network diagram showing an exemplary communication system in which ASON-enabled users communicate over an ASON in accordance with an embodiment of the present invention.

FIG. 5 shows an exemplary communication system 500 in which two ASON-enabled users 510, 520 communicate over the ASON 120. Each of the ASON-enabled users 510,520 implement some or all of the ASON UNI, and therefore are able to monitor and control certain communication services provided by the ASON 120. For example, using the ASON UNI, the ASON-enabled users 510, 520 can establish an end-to-end optical communication path for communicating over the ASON 120. The optical communication path has certain attributes that are negotiated between the two ASON-enabled users 510, 520 and also between the ASON-enabled users 510, 520 and the ASON 120.

Unfortunately, it is not always practical to implement the ASON UNI in each user application that requires ASON communication services. Therefore, another way for the user to access ASON communication services is by employing an optical service agent (OSA) to manage communication services for the user. The OSA is an intelligent, embedded signaling agent that operates within the user at the edge of the ASON 120. The OSA implements application-specific services and intelligence as well as the ASON UNI and other mechanisms for communicating with the ASON controller 340 via the ASON UNI. The OSA can be viewed as a subsystem that understands user requirements and manages various communication services on behalf of the user to meet the user requirements. Specifically, the OSA interacts with the ASON 120 via the ASON UNI to obtain various communication services and manages that communication services for the user based upon predetermined parameters defined by the user. Architecturally, the OSA is layered above the ASON UNI, and uses the ASON UNI to manage and control ASON communication services provided through the ASON controller 340. In essence, then, the OSA provides advanced communication services for the user using the "control knobs" provided by the ASON UNI. For convenience, a user that employs an OSA for managing communication services is referred to hereinafter as an OSA-enabled user.

Figure 6:
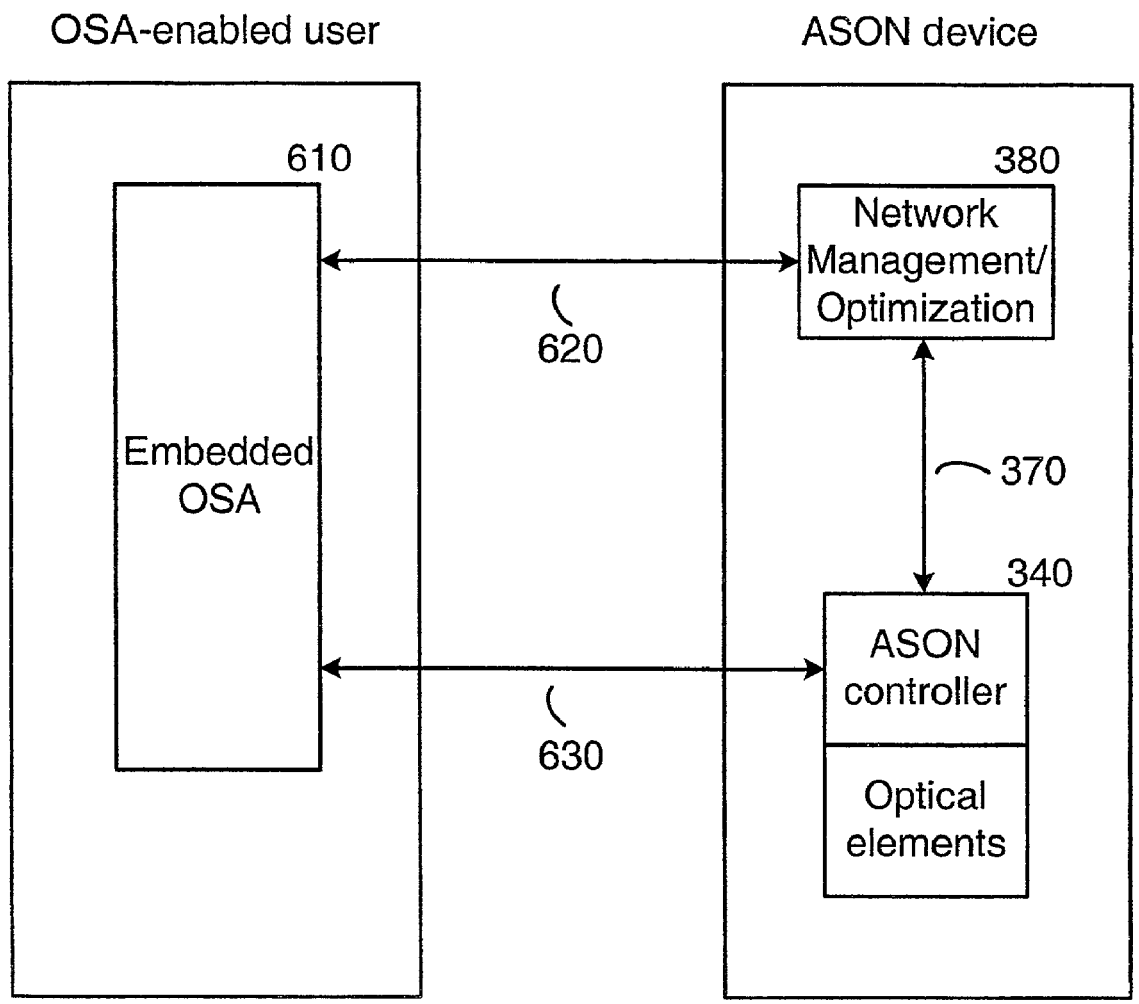
FIG. 6 is a block diagram showing an OSA-enabled user including an embedded OSA in accordance with an embodiment of the present invention.

FIG. 6 shows an OSA-enabled user including an embedded OSA 610. The OSA 610 implements application-specific services and intelligence as well as the ASON UNI and other mechanisms for communicating with the ASON controller 340 via the ASON UNI. The OSA 610 communicates with network management/optimization elements 380 in the ASON 120 via a network management interface 620, and communicates with the ASON controller 340 in the ASON device via the ASON UNI 630 in order to obtain communication services from the ASON 120, specifically by sending service requests to the ASON controller 340 and receiving service responses from the ASON controller 340. The OSA 610 manages the communication services for the user based upon predetermined parameters defined by the user. The ASON controller 340 provides network status information to the network management/optimization elements 380 and receives network updates from the network management/optimization elements 380 via the ASON NMI 370.

The OSA 610 is typically implemented in software, and can be implemented in a platform dependent or platform independent manner. In a platform dependent OSA implementation, the OSA 610 is implemented specifically for a particular platform, and is typically not portable to other platforms. In a platform independent OSA implementation, the OSA 610 is implemented so as to work with multiple platforms, for example, by separating platform-specific functions from the higher level protocols and algorithms and implementing the platform-specific functions separately from the higher level protocols and algorithms such that the higher level protocol/algorithm "layer" can be used with the platform-specific "layer" for a particular platform. The suitability of a particular programming language for implementing the OSA 610 may depend on the type of implementation (platform dependent or platform independent) as well as the execution frequency of the OSA 610. For example, a Java implementation may be suitable for a platform independent implementation in which the OSA 610 is executed infrequently, while a C++ implementation may be more suitable for platform dependent implementations as well as applications in which the OSA 610 is executed more frequently.

Whether the OSA 610 is implemented in a platform dependent or platform independent manner, the OSA 610 typically includes various user-controllable and user-customizable features. In order for a user application to access these user-controllable and user-customizable features, the OSA 610 typically includes an OSA Application Program Interface (API) that includes various primitives for accessing the user-controllable and user-customizable features of the OSA 610. The OSA API is typically simpler than the ASON UNI, particularly because the OSA API is typically an internal software interface that does not need to implement the complexities of the ASON UNI (such as mechanisms for communicating over a UNI signaling channel).

Figure 7:
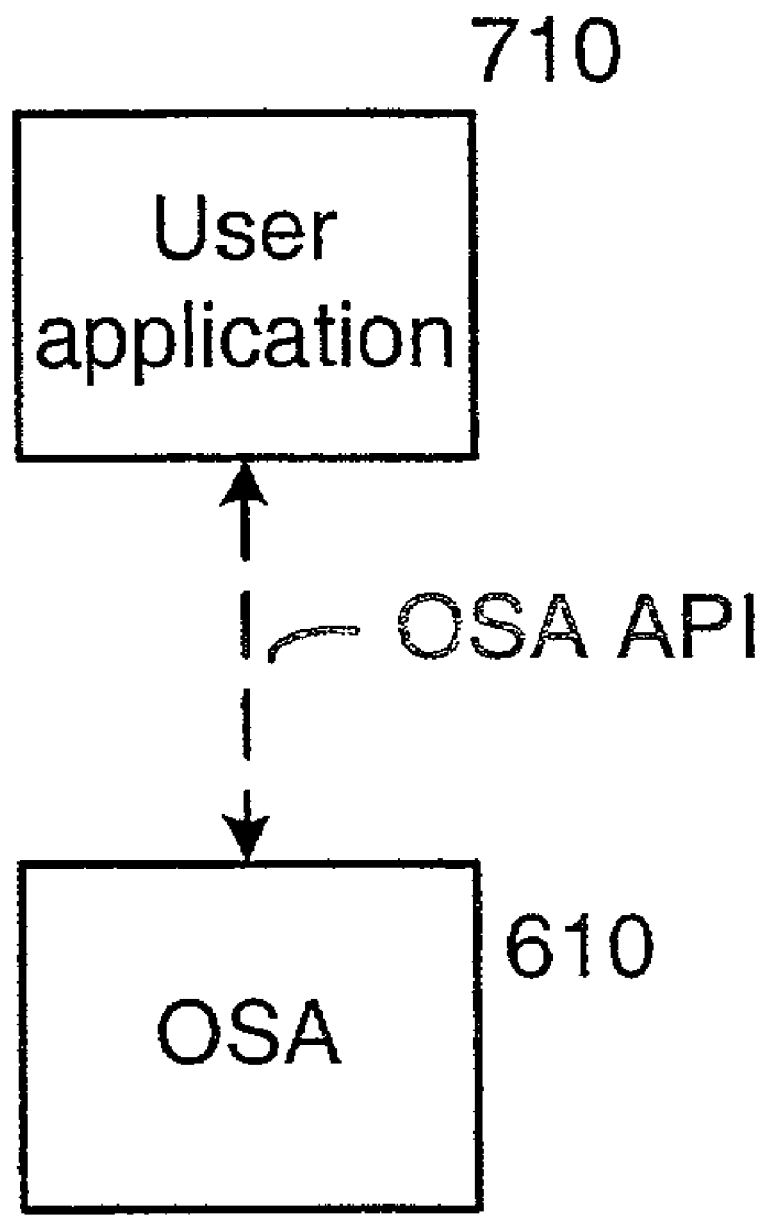
FIG. 7 is a diagram showing the relationship between a user application and the OSA in accordance with an embodiment of the present invention.

FIG. 7 shows the relationship between a user application 710 and the OSA 610. The OSA 610 provides an OSA API through which the user application 710 can access the OSA 610. The OSA API includes various primitives for accessing the user-controllable and user-customizable features of the OSA 610.

In a typical embodiment of the OSA 610, the OSA 610 is separated into two components, namely an application component (referred to hereinafter as the OSA-A) and a network component (referred to hereinafter as the OSA-N). The OSA-A and the OSA-N communication via a control interface, which, depending on the placement of the OSA-N (discussed below), may be the ASON UNI or another control interface.

The OSA-A is the application piece of the OSA 610. The OSA-A implements application-specific services and intelligence. Because the OSA-A is so tightly coupled to the user application, the OSA-A typically resides on the user platform in the edge system. The OSA-A manages communication services on behalf of the user, specifically by requesting communication services from the ASON 120 via the OSA-N and mapping communication services from the ASON 120 to the user network or application.

The OSA-N is the network piece of the OSA 610. Among other things, the OSA-N provides functionality for user authentication, registration, and membership. Authentication functionality enables the network to authenticate the user in order to ensure that the user is permitted to access ASON communication services. Registration functionality enables the user to register a user identifier with the network. For example, in an Internet Service Provider (ISP) application, the user identifier is typically the address of the router attachment to the ASON device (i.e., the IP address of the ASON controller and the UNI control channel identifier), which can be viewed as the L1/L2 address of the router interface. Membership functionality enables the user to join a multicast group along with other peer users of the ASON 120. The OSA-N may reside on the user platform in the edge system or in the ASON device at the edge of the ASON 120.

Figure 8:
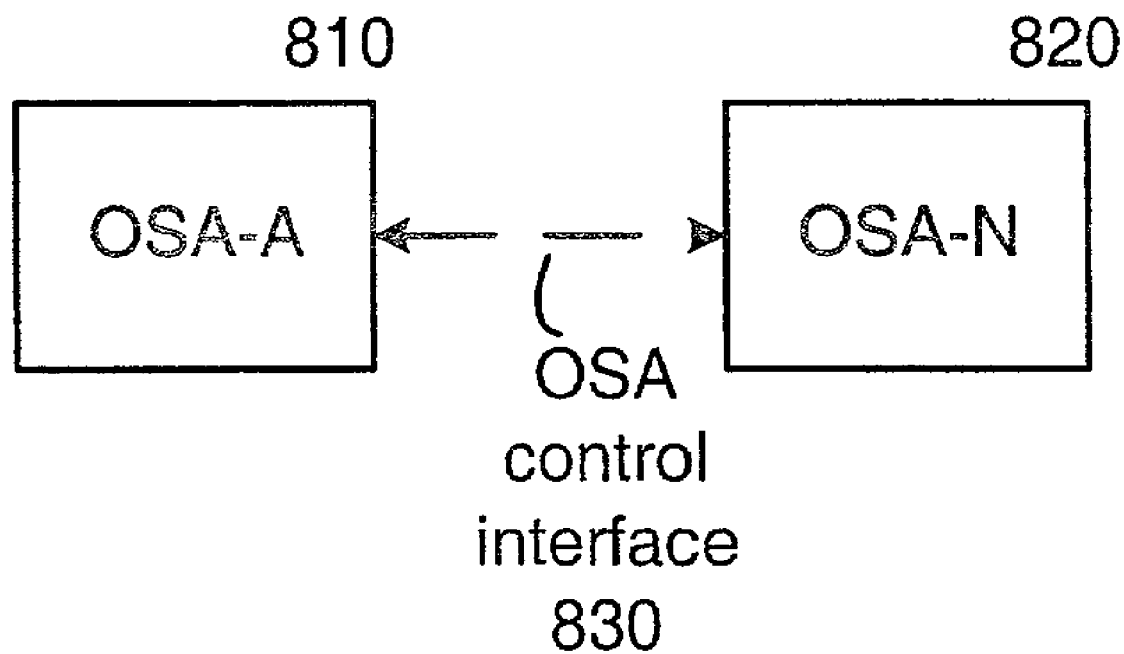
FIG. 8 is a diagram showing the relationship between the OSA-A and the OSA-N in accordance with an embodiment of the present invention.

FIG. 8 shows the relationship between the OSA-A 810 and the OSA-N 820. The OSA-A implements application-specific services and intelligence for managing communication services on behalf of the user. The OSA-N provides functionality for user authentication, registration, and membership. The OSA-A and the OSA-N communicate via the OSA control interface 830.

Figure 9:
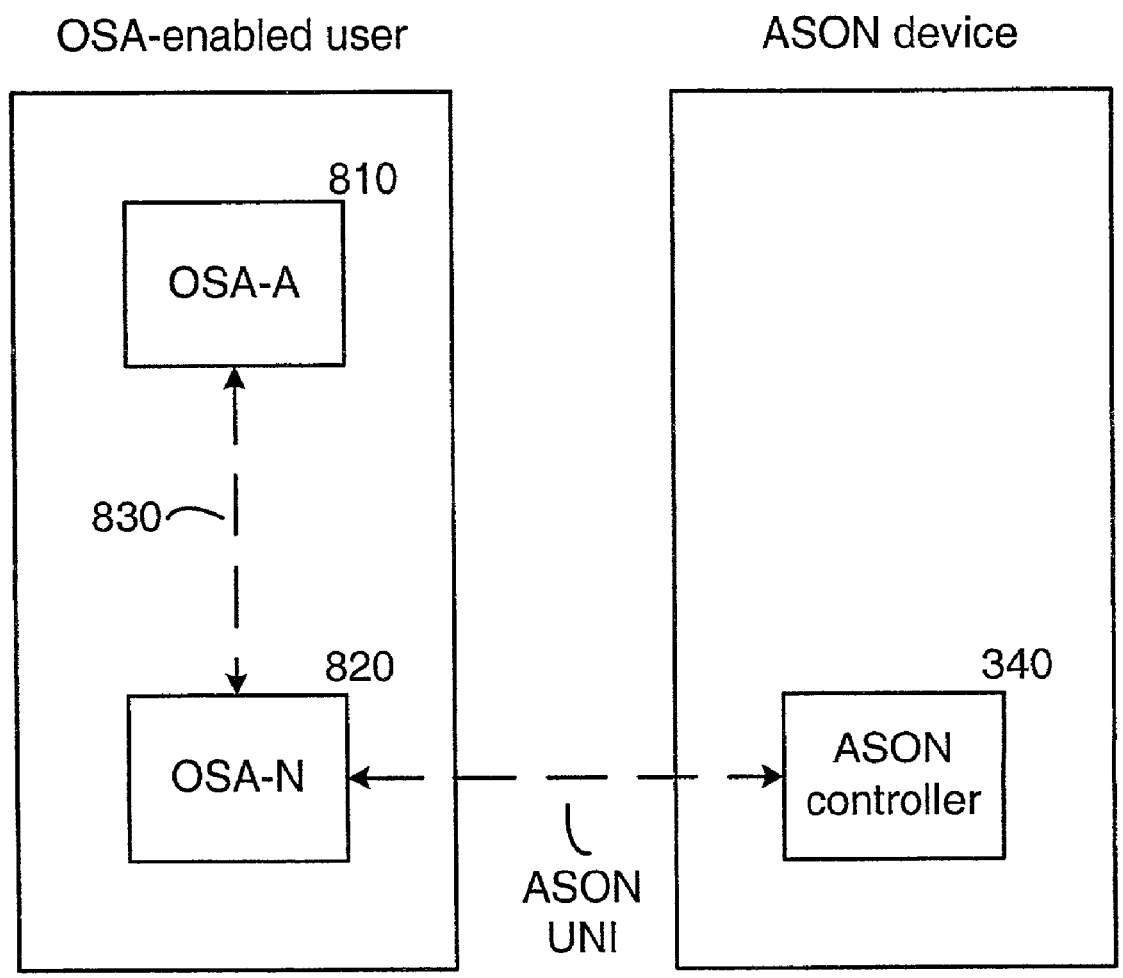
FIG. 9 is a diagram showing an exemplary system in which the OSA-N resides in the OSA-enabled user in the edge system in accordance with an embodiment of the present invention.

FIG. 9 shows an exemplary system in which the OSA-N 820 resides in the OSA-enabled user in the edge system. Specifically, the OSA-enabled user includes both the OSA-A 810 and the OSA-N 820. The OSA-A 810 and the OSA-N 820 communicate via the OSA control interface 830. In this case, the OSA control interface 830 is typically a software interface between the OSA-A 810 and OSA-N 820 components. The OSA-A 810 implements application specific services and intelligence. The OSA-N 820 provides functionality for user authentication, registration, and membership, and implements the ASON UNI and other mechanisms for communicating with the ASON controller 340 in the ASON device. In this configuration, the OSA-N 820 can be implemented as a device driver for the specific UNI signaling channel interface between the OSA-enabled user and the ASON device. The OSA-A 810 can be used over different types of UNI signaling channels, for example, by installing an appropriate OSA-N device driver that supports the UNI signaling channel for a particular application.

Figure 10:
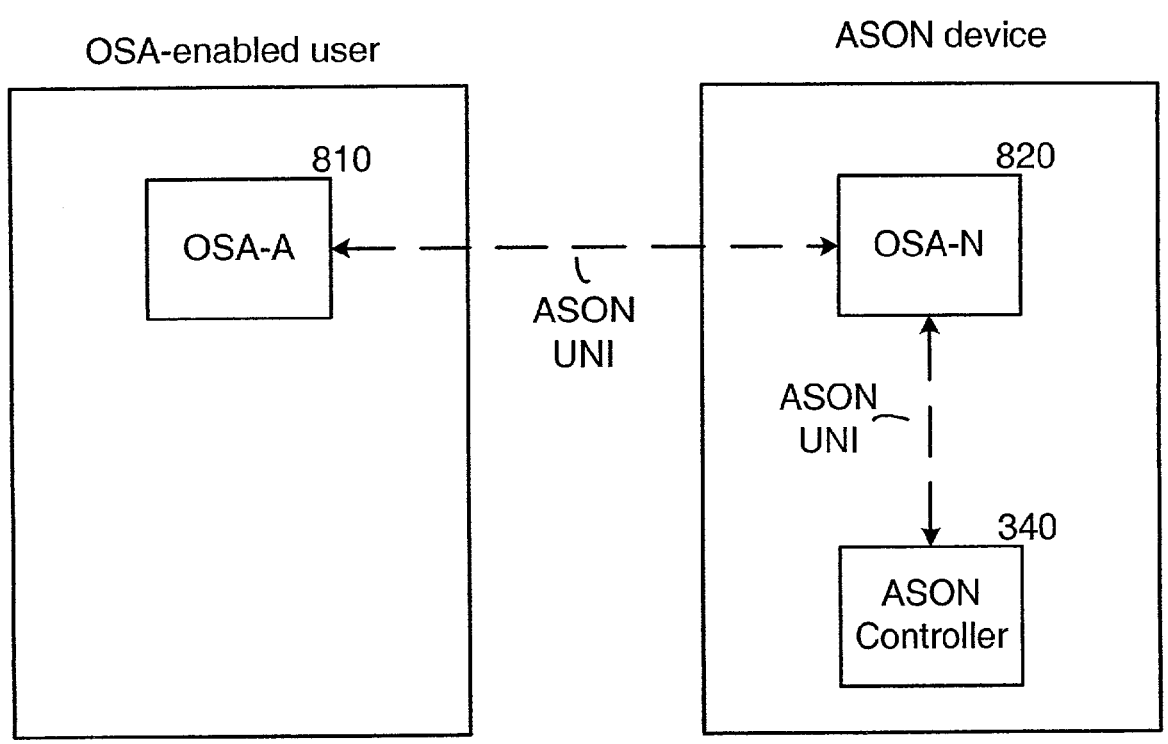
FIG. 10 is a diagram showing an exemplary system in which the OSAN resides in the ASON user at the edge of the ASON in accordance with an embodiment of the present invention.

FIG. 10 shows an exemplary system in which the OSA-N 820 resides in the ASON user at the edge of the ASON 120. Specifically, the ASON device includes the OSA-N 820 and the ASON controller 340. The OSA-A 810 in the OSA-enabled user communicates with the OSA-N 820 in the ASON device via the ASON UNI. With the OSA-N 820 resident in the ASON device, the ASON device (i.e., the service provider) can provide advanced communication services to the OSA-enabled user that are controlled through the OSA-A 810.

Figure 11:
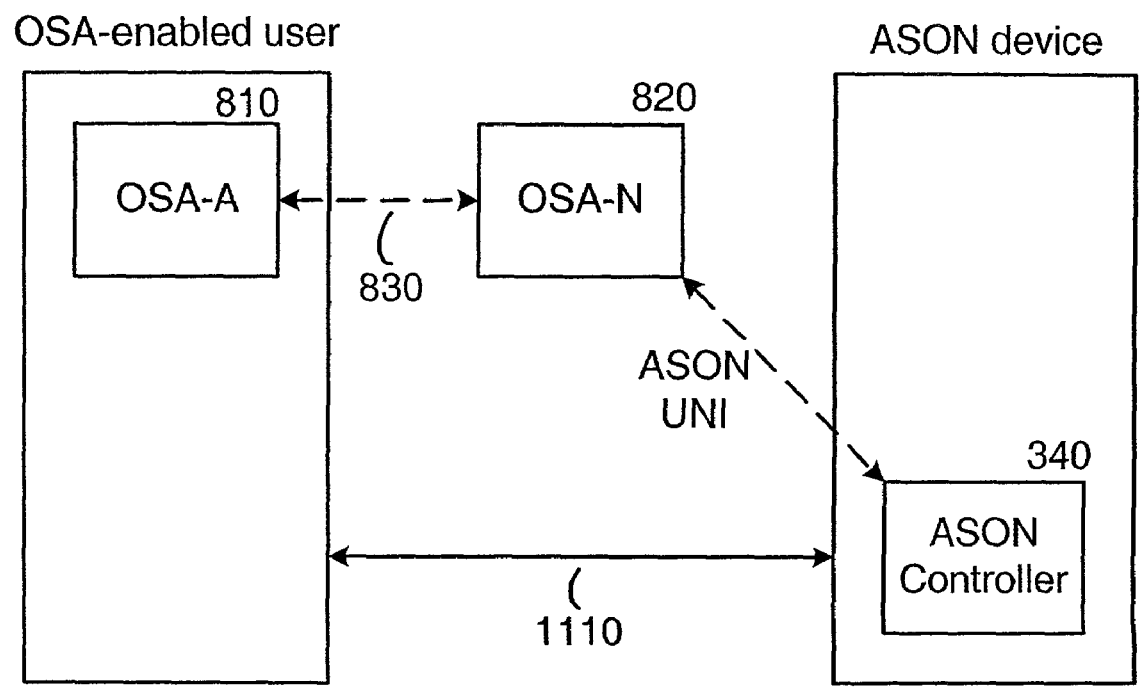
FIG. 11 is a diagram showing an exemplary system in which the OSAN resides outside of the OSA-enabled user and the ASON device in a proxy arrangement in accordance with an embodiment of the present invention.

FIG. 11 shows an exemplary system in which the OSA-N 820 resides outside of both the OSA-enabled user and the ASON device in a proxy arrangement. In this proxy arrangement, the OSA-enabled user is not required to support the ASON UNI signaling channel over the bearer channel 1110. Instead, a separate control channel 830 can be established for communication between the OSA-A 810 in the OSA-enabled user and the OSA-N 820. The OSA-A 810 sends requests to the OSA-N 820 for ASON services, and the OSA-N 820 carries out the requests using the ASON UNI. Such a proxy-based OSA/UNI can be useful in extending ASON services to legacy optical edge equipment.

In order to guarantee service to its users and maintain integrity of the optical core, the ASON 120 needs to provide a level of security and authentication. The fact that there is an enabled physical connection between an ASON-enabled user and the ASON device may be sufficient authentication for the ASON-enabled user to access the ASON 120. However, as ASON usage grows and OSA is deployed, the ASON 120 will need to authenticate the OSA-enabled users so that only authorized OSA-enabled users are able to access the ASON 120. Therefore, the ASON 120 will authenticate each OSA-enabled user that registers with the ASON controller.

In one embodiment, an authentication server is used to authenticate OSA-enabled users. The authentication server is typically a centralized database that uses an authentication protocol for authentication. The authentication protocol can use any of a variety of authentication techniques, such as challenge-based handshake authentication or simple user-name/password based authentication.

In another embodiment, each ASON controller 340 uses public key technology (i.e., authentication certificates) to authenticate OSA-enabled users that register with it. This requires that the OSA understand and manage authentication certificates for the OSA-enabled user.

Data security is a user-based feature that needs to be implemented at the edge of the enterprise network. The OSA software need not support data integrity.

Architecturally, the OSA-N functionality can be implemented in different ways. The suitability of a particular OSA-N architecture depends on a number of characteristics, such as such as implementation complexity, fault tolerance, UNI bandwidth utilization, UNI signaling delay, memory utilization, and computational complexity. Because OSA-N is layered on top of the ASON UNI, an important consideration is the UNI bandwidth utilization and signaling delay for OSA signaling. Latency is important because it affects the type of applications OSA can support.

A number of exemplary OSA-N architectures, namely a client-server architecture, a distributed flooding architecture, a hybrid/proxy architecture, and an ASON-coupled architecture, are discussed herein. It should be noted, however, that the present invention is in no way limited to any of the described OSA-N implementations or to any particular OSA-N implementation.

Figure 12:
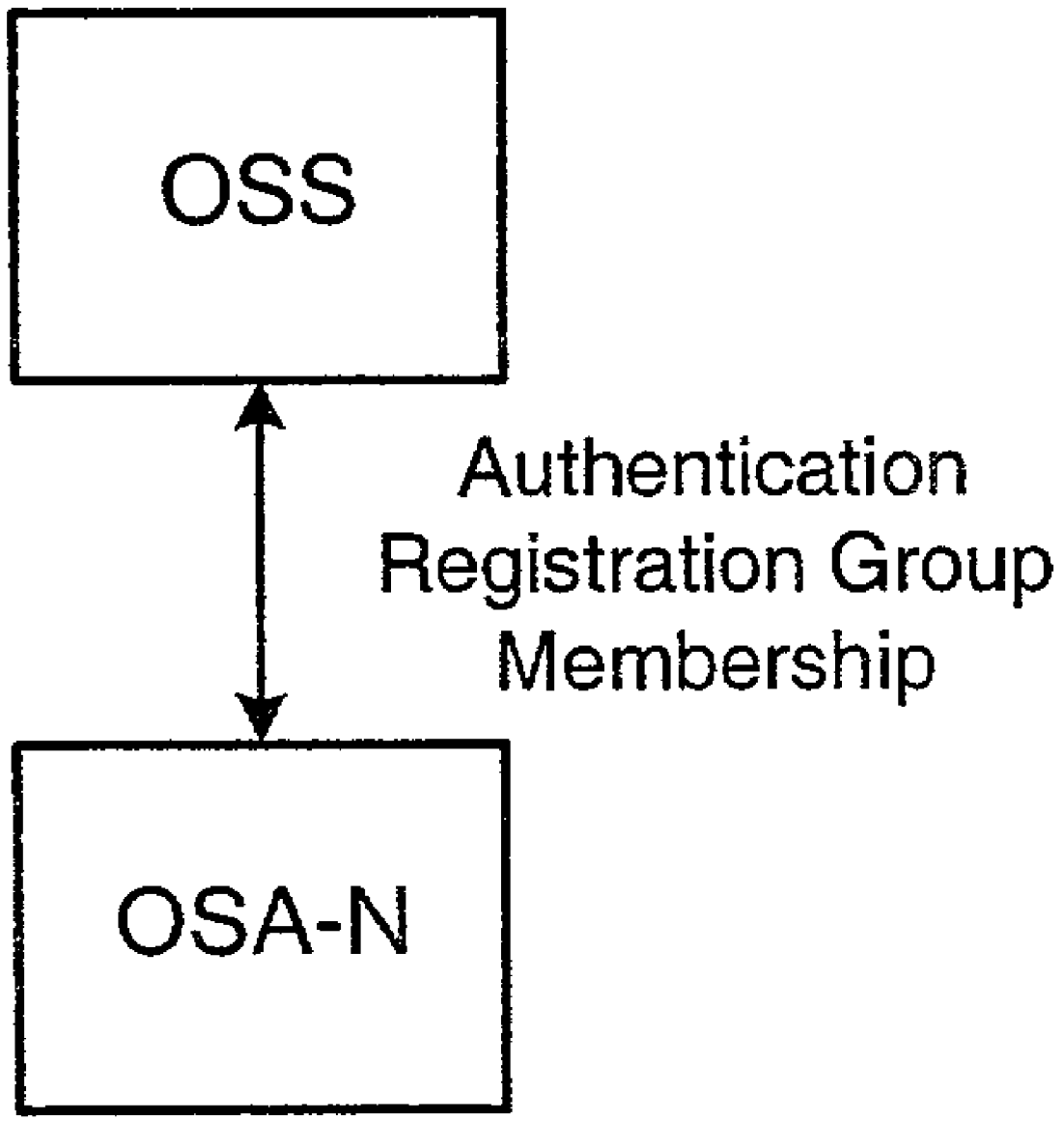
FIG. 12 is a diagram depicting how OSA-N functionality is handled by the OSS in accordance with a client-server embodiment of the present invention.

In the client-server architecture, most of the OSA-N functionality, including authentication, registration, and group membership, is handled by an optical service server (OSS), as shown in FIG. 12. The OSS maintains authentication, registration, and group membership information for multiple OSA-enabled devices. The OSA-enabled user is typically pre-configured with a group identifier. When the OSA-enabled user is attached to the ASON 120, the OSA-N sends a registration message to the OSS. The OSA-N includes its group identifier in the registration message. The OSS stores the group identifier in its registration database. The OSA-N queries the OSS to obtain group membership information that includes the identity and location of peer users.

Figure 13:
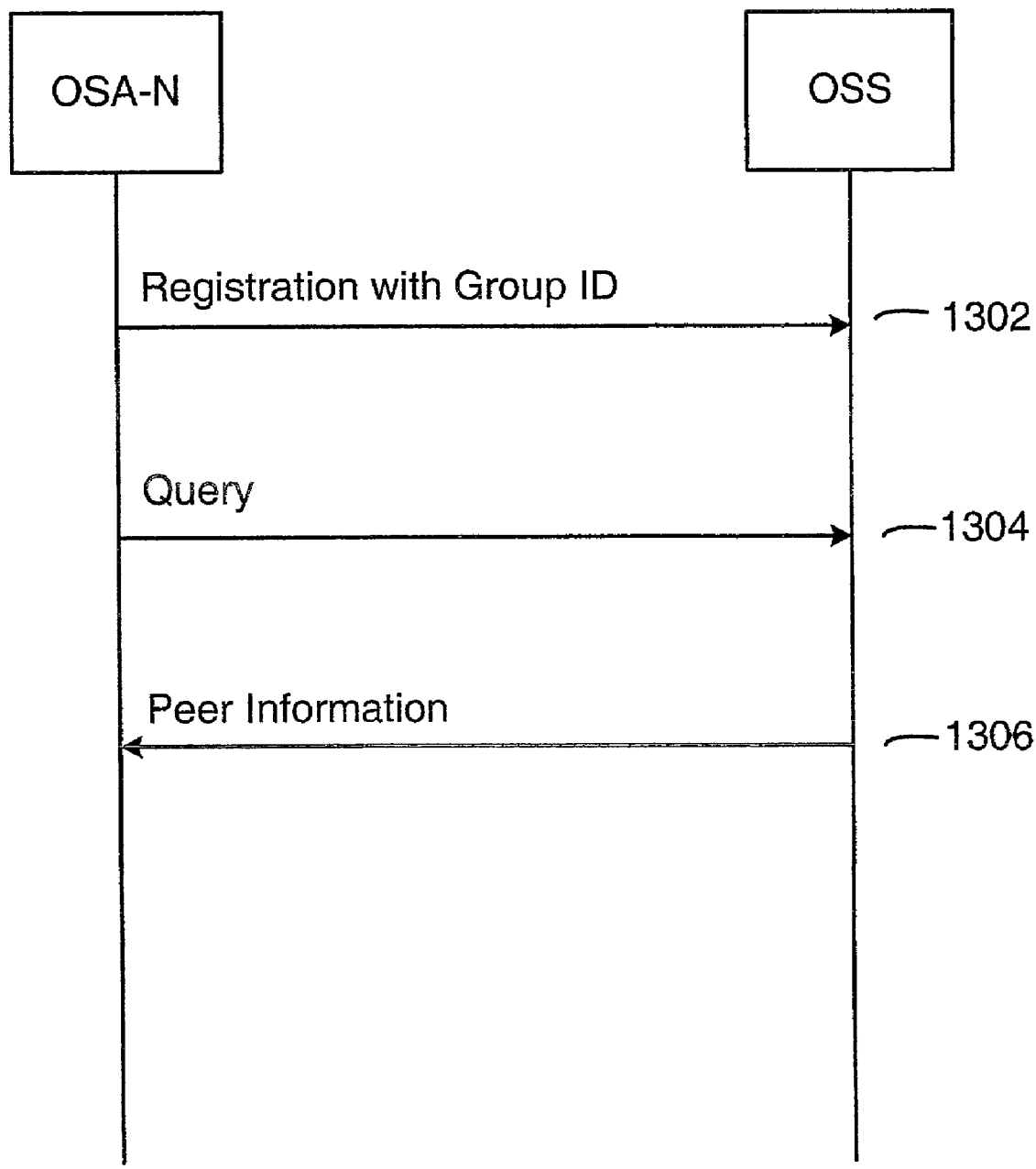
FIG. 13 is a message flow diagram depicting various exchanges between the OSA-N and the OSS in accordance with a client-server embodiment of the present invention.

FIG. 13 is a message flow diagram depicting various exchanges between the OSA-N and the OSS in the client-server architecture. The OSA-N sends a registration message 1302 to the OSS including the group identifier (ID) for the OSA-enabled user. The OSS stores the group identifier in its registration database. The OSA-N then sends a query message 1304 to the OSS to obtain group membership information that includes the identity and location of peer users. The OSS sends peer information 1306 to the OSA-N in response to the query 1304.

The client-server architecture has a number of characteristics that are considered to be advantages. First, the client-server architecture is relatively simple to implement. Second, the amount of signaling bandwidth (both UNI and NNI) is relatively small, in part because group membership information is maintained and distributed by the OSS and therefore there is no need to advertise group membership information to the network. Signaling bandwidth can be further reduced by having the OSA-N cache the group membership information it retrieves from the OSS, with a periodic refresh technique used to keep the cache current.

The client-server architecture has a number of characteristics that are considered to be disadvantages. First, the OSS represents a single point of failure so that, if the OSS fails, the network cannot perform authentication, registration, and group membership functions. This problem can be mitigated by running a "backup" OSS and using a synchronization protocol, such as the Server Cache Synchronization Protocol (SCSP) as described in RFC 2334, to maintain synchronization between the servers, although this adds implementational complexity. Second, because the client-server architecture is server-based, the network is heavily dependent upon the availability, reliability, and performance of the OSS, which could become a bottleneck for overall system performance, specifically in terms of delay. Third, like other types of centralized solutions, the client-server architecture is not scalable. Fourth, in order to register with the OSS, the OSA-enabled user must be manually configured with its group identifier.

Figure 14:
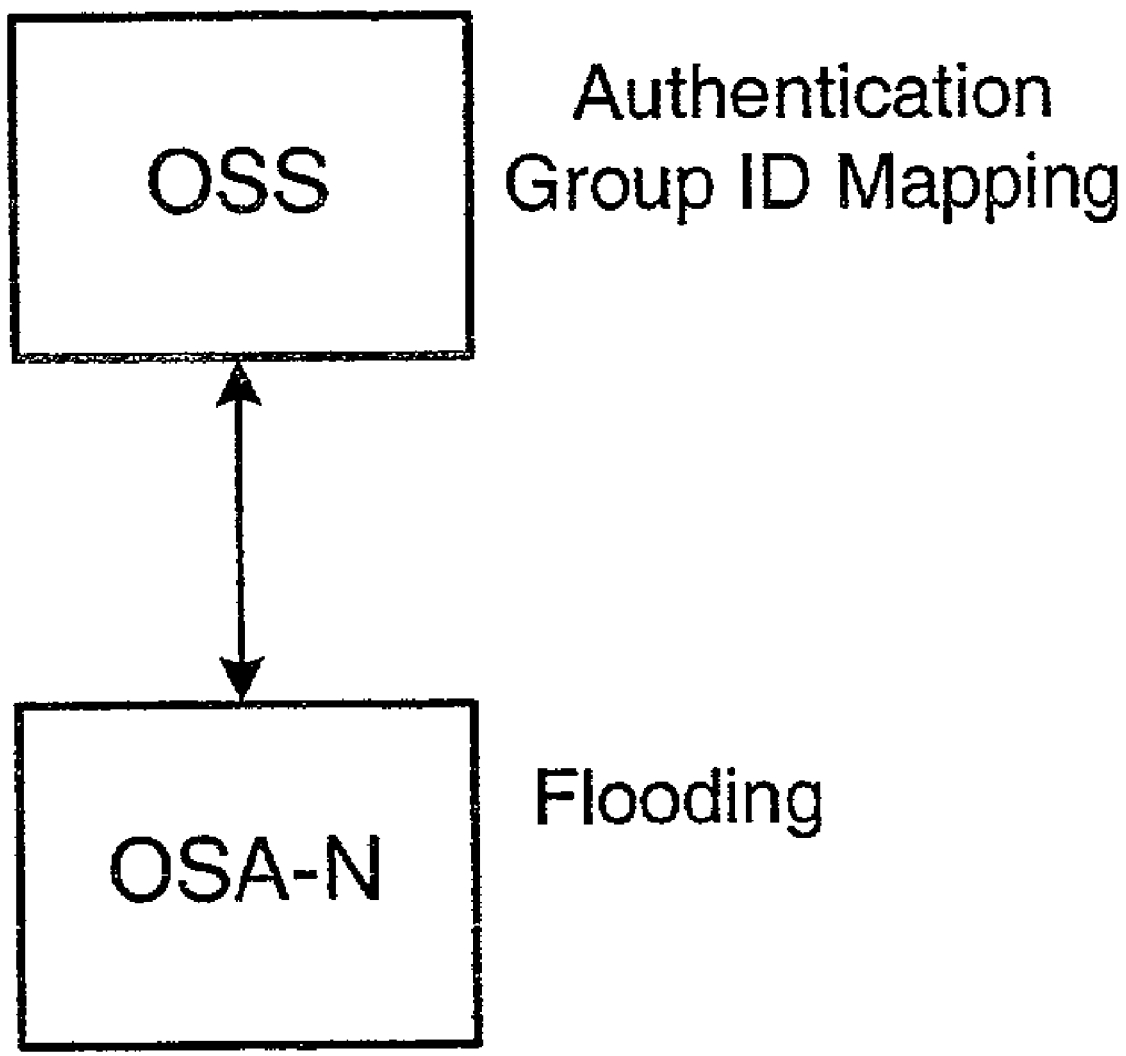
FIG. 14 is a diagram depicting how authentication is handled by the OSA in accordance with a distributed flooding embodiment of the present invention.

In the distributed flooding architecture, authentication is handled by the OSS, as shown in FIG. 14. The OSS maintains authentication information for multiple OSA-enabled users, and also maintains a group identifier for each OSA-enabled user. After authenticating an OSA-enabled user, the OSS informs the OSA-enabled user of its group identifier. The OSA-enabled user then informs the other OSA-enabled users in the network of its group membership, specifically by flooding an advertisement through the network, for example, in a manner similar to OSPF-TE and PNNI Augmented Routing. This flooding occurs periodically and, since the procedure is similar to that of OSPF and PNNI, inherits the advantages of both protocols. The link state advertisement (LSA) and neighbor database is maintained in the user domain rather than in the network domain.

Figure 15:
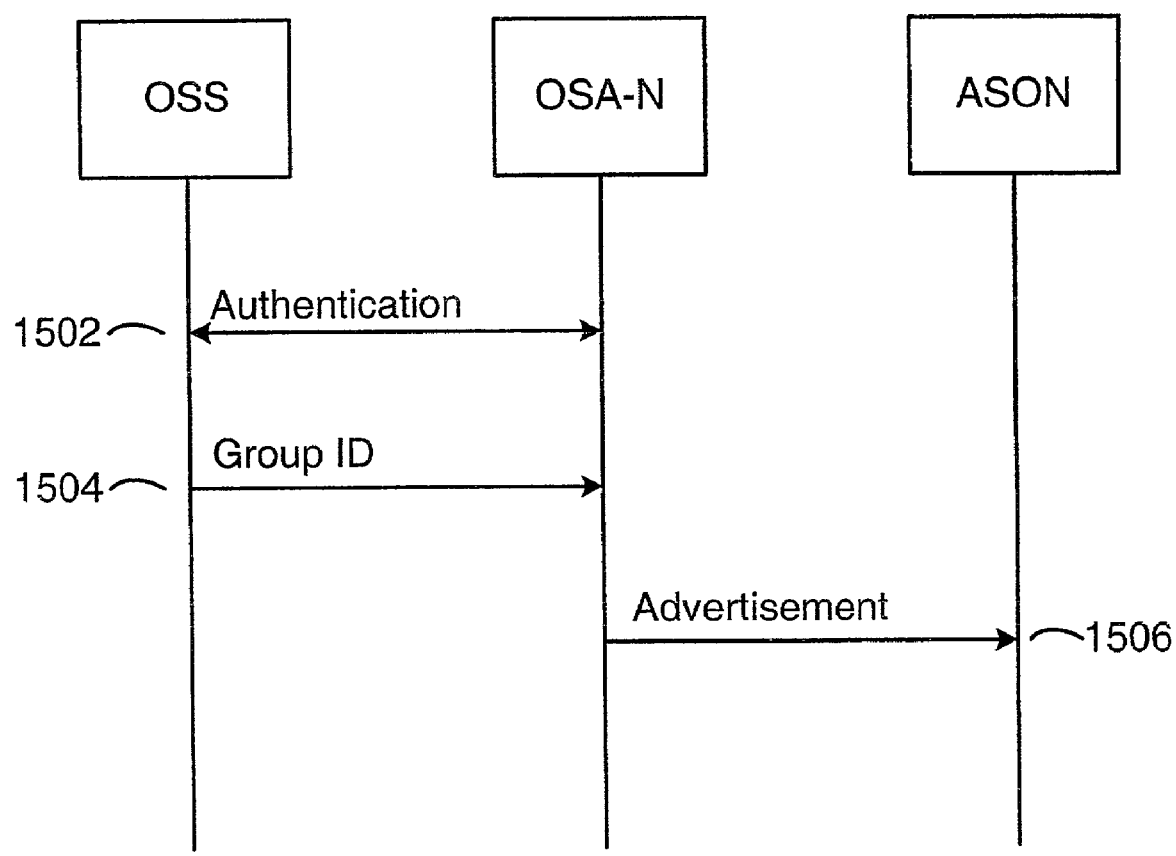
FIG. 15 is a message flow diagram depicting various exchanges between the OSA-N and the OSS in accordance with a distributed flooding embodiment of the present invention.

FIG. 15 is a message flow diagram depicting various exchanges between the OSA-N and the OSS in the distributed flooding architecture. The OSS authenticates the OSA-N through a number of exchanges 1502. After authenticating the OSA-N, the OSS determines the group identifier (ID) for the OSA-enabled user, and sends a group identifier (ID) 1504 to the OSA-N. The OSA-N sends an advertisement message 1506 into the ASON. The advertisement message 1506 is flooded throughout the network.

The distributed flooding architecture has a number of characteristics that are considered to be advantages of the distributed flooding architecture. First, it allows centralized policy as to which OSA-enabled users can join a group. Second, it does not require manual configuration of the group identifier, and instead uses the OSS to distribute the group identifier after authentication of the OSA-enabled user. Third, it is well-suited to IP-router end systems, since OSPF is an extensible IP protocol by virtue of Opaque Link State Advertisements (LSA).

The distributed flooding architecture has a number of characteristics that are considered to be disadvantages of the distributed flooding architecture. First, if the OSS is out of service, then the OSA-enabled user will not be able to authenticate and determine its group identifier, and so the OSA-enabled user will not be able to determine its peers automatically. This problem can be mitigated by providing peer information to the OSA-enabled user manually, which would allow connections to be made using the ASON. In this respect, the distributed flooding architecture advantageously separates optical network operation from the availability of the OSS and allows the OSA to own most of the intelligence. Second, the flooding mechanism uses extra bandwidth in the ASON signaling network (both UNI and NNI), which can be particularly problematic if the UNI has limited bandwidth. Third, flooding does not occur until authentication is complete. Fourth, an OSPF-based flooding mechanism requires IP support, and is therefore not suitable for non-IP routers. Fifth, because the LSA and neighbor database is maintained in the user domain rather than the network domain, topological information must be "leaked" to the OSA-enabled user, which can be done by implementing some form of NNI in the UNI and thereby confusing the separation between the NNI and the UNI.

Figure 16:
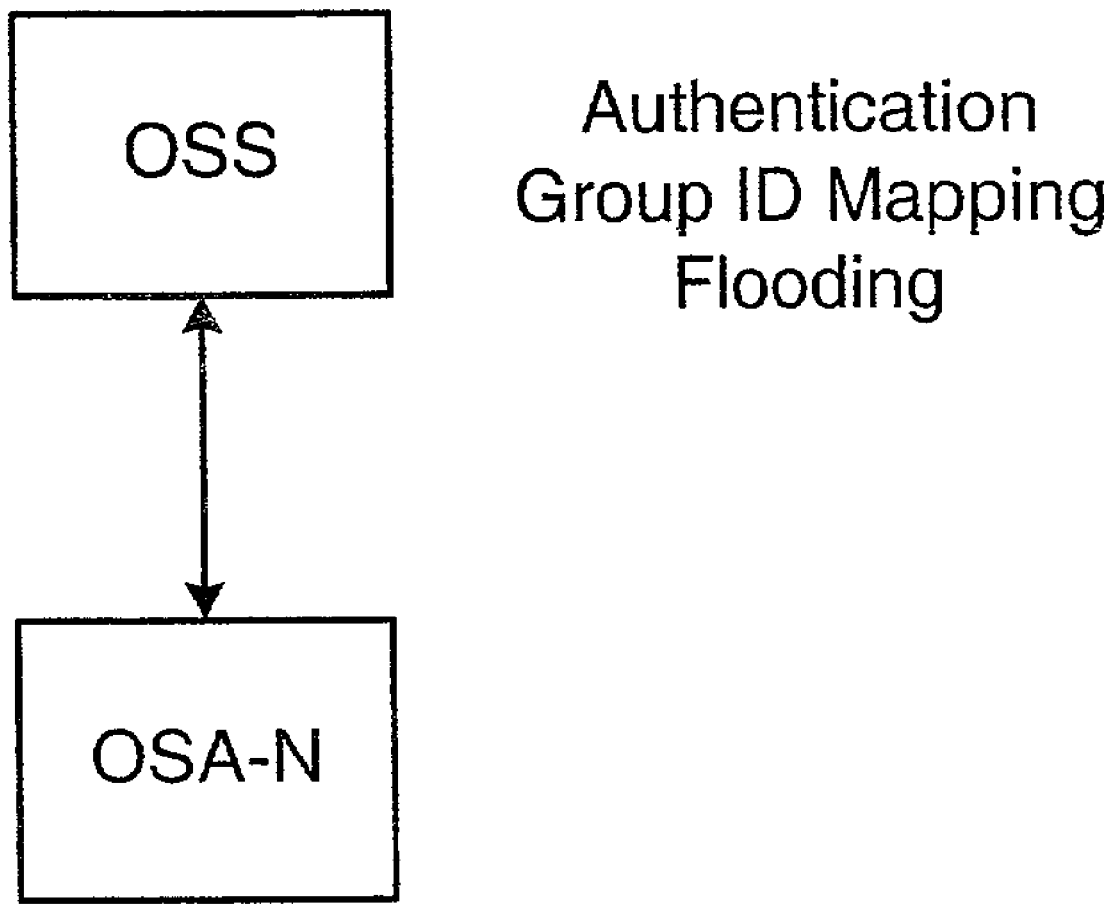
FIG. 16 is a diagram depicting how authentication and flooding are handled by the OSS in accordance with a hybrid/proxy embodiment of the present invention.

In the hybrid/proxy architecture, authentication and flooding are handled by the OSS, as shown in FIG. 16. The OSS maintains authentication information for multiple OSA-enabled users, and also maintains a group identifier for each OSA-enabled user. After authenticating an OSA-enabled user, the OSS floods the advertisement on behalf of the OSA-enabled user, for example, using a mechanism similar to Proxy-PAR.

Figure 17:
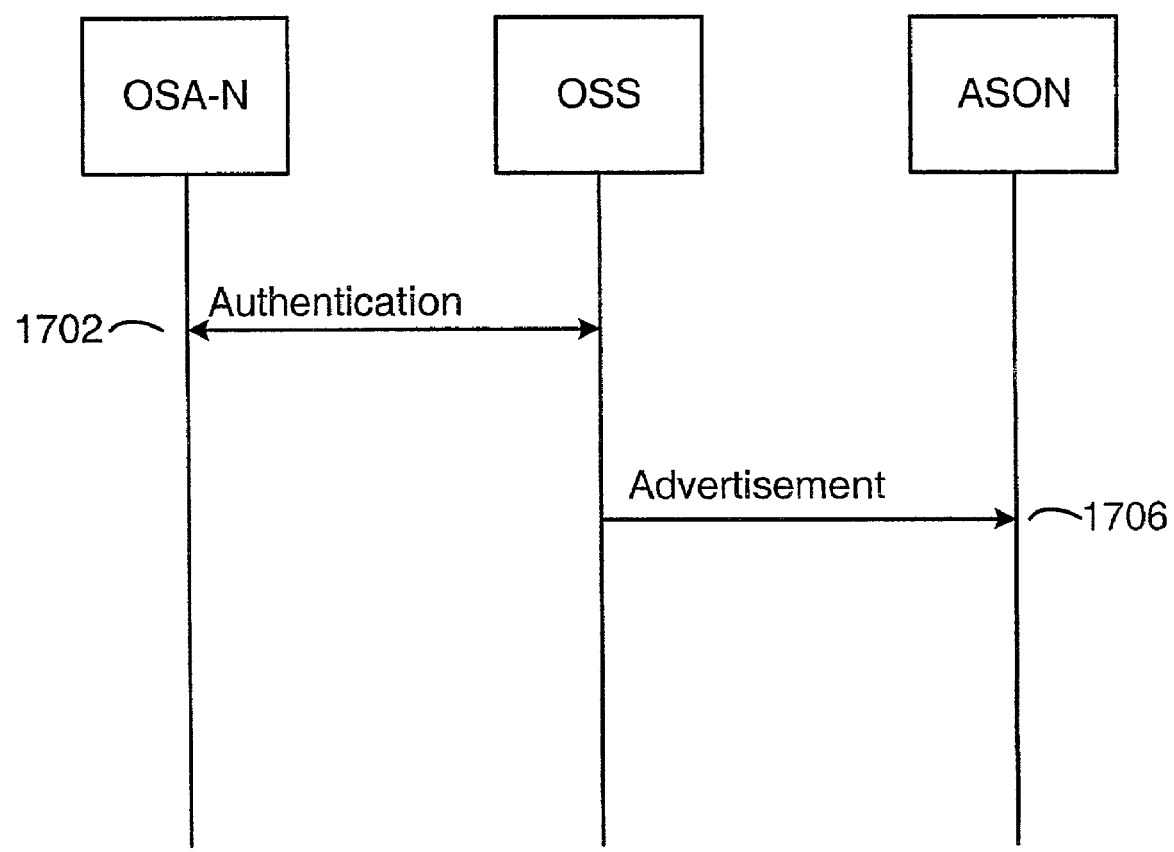
FIG. 17 is a message flow diagram depicting various exchanges between the OSA-N and the OSS in accordance with a hybrid/proxy embodiment of the present invention.

FIG. 17 is a message flow diagram depicting various exchanges between the OSA-N and the OSS in the hybrid/proxy architecture. The OSS authenticates the OSA-N through a number of exchanges 1702. After authenticating the OSA-N, the OSS determines the group identifier (ID) for the OSA-enabled user, and sends an advertisement message 1706 into the ASON. The advertisement message 1706 is flooded throughout the network.

The hybrid/proxy architecture is similar to the distributed flooding architecture, and therefore has many of the same advantageous and disadvantageous characteristics as the distributed flooding architecture. However, because the OSS rather than the OSA-N floods the advertisement, the OSS does not need to "leak" topological information to the OSA-enabled user. Therefore, there is no confusion of the separation between the NNI and the UNI.

In the ASON-coupled architecture, the various OSS services described with reference to the client-server architecture are handled by the ASON devices at the periphery of the ASON 120, with each ASON device acting as the OSS for its directly attached OSA-enabled device. The ASON-coupled architecture has many characteristics that are considered to be advantages of the ASON-coupled architecture. First, because there is no central server, network performance does not depend upon the availability and reliability of a single server. Second, because an ASON device services only its directly attached OSA-enabled user, a failure of the ASON device affects only the directly attached OSA-enabled device. Third, the ASON-coupled architecture is scalable, particularly because of the one-to-one mapping between clients and servers, and also because the ASON device only needs to maintain advertisements for the group associated with its directly attached OSA-enabled user. Fourth, the amount of UNI signaling bandwidth is relatively small. Fifth, because link state advertisements are stored by the ASON device rather than in the user domain, the ASON device can detect a failure of its directly attached OSA-enabled user and invalidate the link state advertisement for the OSA-enabled user, thus allowing peer users to more quickly detect the failure of the OSA-enabled user (otherwise, the peer users would need to wait for a link state advertisement timeout to detect the failure, which, in OSPF, is typically a MaxAge of 1 hour). Sixth, because the ASON device is already running ASON-specific OSPF, adding extra link state advertisements into the link state database is relatively easy. Seventh, because no topological information needs to be "leaked" to the OSA-enabled user, the separation of UNI and NNI is clear. Eighth, because the link state advertisements are handled by the ASON device, the OSA-enabled user does not necessarily need to implement OSPF, which can be a big advantage in certain applications.

Of the four OSA-N implementation architectures described above, the ASON-coupled architecture seems most suitable for typical applications, particularly because of its clearly defined separation of UNI and NNI, flexible implementation platforms, and simplicity for client systems. OSA-A must be customized on a case-by-case basis and requires a lot of close work with customer.

As discussed above, both the ASON-enabled user and the OSA-enabled user implement at least some of the ASON UNI functionality for obtaining communication services from the ASON 120. The OSA-enabled user additionally includes the OSA 610 for performing a variety of advanced communication services using the ASON UNI.

As shown and discussed with reference to FIG. 5 above, two ASON-enabled users can communicate over the ASON 120 using the ASON UNI. However, the types of communication services available to the ASON-enabled users is essentially limited to those that are provided directly by the ASON 120.

On the other hand, an OSA-enabled user can interoperate with ASON-enabled users and/or with other OSA-enabled users over the ASON 120. When interoperating with other OSA-enabled users, a full set of OSA-enabled features can be supported end-to-end across the ASON 120. When interoperating with an ASON-enabled user that does not support OSA, only a limited set of features can be supported end-to-end across the ASON 120 (such as setting up an optical communication path through the ASON 120).

Figure 18:
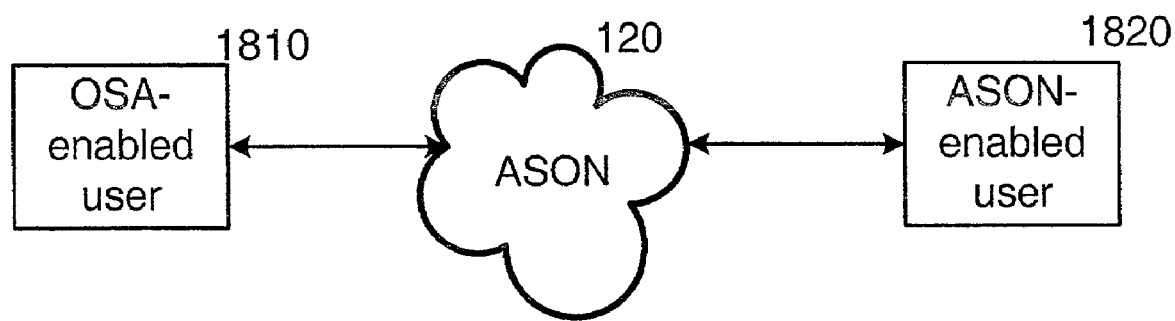
FIG. 18 is a network diagram showing an exemplary communication system in which an OSA-enabled user communicates with an ASON-enabled user over the ASON in accordance with an embodiment of the present invention.

FIG. 18 shows an exemplary communication system 1800 in which an OSA-enabled user 1810 communicates with an ASON-enabled user 1820 over the ASON 120. The ASON-enabled user 1820 implements some or all of the ASON UNI. The OSA-enabled user 1810 implements advanced functions using the ASON UNI. Because the ASON-enabled user 1820 does not implement OSA functionality, the OSA-enabled user 1810 and the ASON-enabled user 1820 can support only a limited set of features end-to-end across the ASON 120. For example, using the ASON UNI, the OSA-enabled user 1810 and the ASON-enabled user 1820 can establish an end-to-end optical communication path for communicating over the ASON 120.

Figure 19:
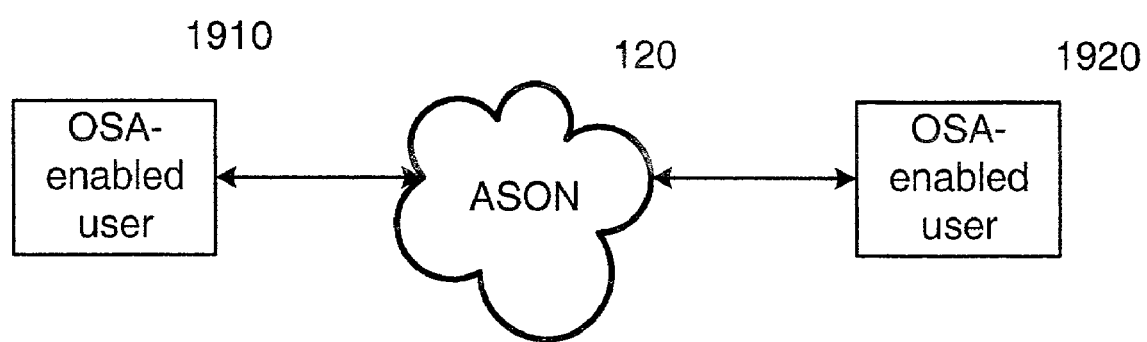
FIG. 19 is a network diagram showing an exemplary communication system in which two OSA-enabled users communicate over the ASON in accordance with an embodiment of the present invention.

FIG. 19 shows an exemplary communication system 1900 in which two OSA-enabled users 1910, 1920 communicate over the ASON 120. The OSA-enabled users 1910, 1920 implement advanced functions using the ASON UNI. Because both OSA-enabled users 1910, 1920 implement OSA functionality, the OSA-enabled users 1910, 1920 can support a full set of features end-to-end across the ASON 120.

In order to manage various communication services, the OSA 610 includes optical service logic that implements application-specific services and intelligence. The optical service logic interacts with the ASON 120 via the ASON UNI. The optical service logic also interacts with other OSA-enabled users via a peer-to-peer signaling mechanism. The peer-to-peer signaling mechanism enables communication between OSA-enabled users within a user network and/or across the ASON 120. Thus, using the peer-to-peer signaling mechanism, OSA-enabled users within the user network can interoperate over intra-domain signaling channels, and OSA-enabled users at the edge of the ASON 120 can interoperate across the ASON 120 over ASON signaling channels. Among other things, the peer-to-peer signaling mechanism effectively extends OSA functionality to OSA-enabled users that are not at the edge of the ASON 120.

It should be noted that, while the OSA-enabled users at the edge of the ASON 120 implement the ASON UNI and interact with the ASON 120 via the ASON UNI, OSA-enabled users that are not adjacent to the ASON 120 are unable to interact directly with the ASON 120 via the ASON UNI. Therefore, such OSA-enabled users cannot directly access ASON services. Such OSA-enabled users can, however, channel ASON service requests through the OSA-enabled user at the edge of the ASON 120 using the peer-to-peer signaling mechanism. Specifically, an OSA-enabled user forwards an ASON service request to an OSA-enabled user at the edge of the ASON 120 using the peer-to-peer signaling mechanism. In turn, the OSA-enabled user at the edge of the ASON 120 interacts with the ASON 120 via the ASON UNI to execute the ASON service request, and responds if necessary using the peer-to-peer signaling mechanism.

Certain communication services can be managed by a single OSA-enabled user. However, other communication services require that a number of OSA-enabled users interoperate to coordinate communication services. This is particularly true when communication services are coordinated end-to-end between peer OSA-enabled users across the ASON 120. In order for OSA-enabled users to interoperate, each OSA-enabled user needs to identify its peer OSA-enabled users and obtain various types of peer information for each peer OSA-enabled user, such as an attachment address that is used for establishing an optical communication path to the peer OSA-enabled user. Therefore, the OSA typically includes mechanisms for identifying peer OSA-enabled users and for obtaining the peer information.

In a typical embodiment of the present invention, the OSA includes auto-discovery logic by which an OSA-enabled user automatically discovers its peer OSA-enabled users and obtains the various types of peer information for each of its peer OSA-enabled users. The auto-discovery logic typically uses an advertisement mechanism for exchanging peer information between OSA-enabled users, similar to the exchanging of link state advertisements by OSPF, although the auto-discovery logic is not limited to any particular advertisement or discovery mechanism. Each OSA-enabled user typically includes a peer database in which the peer information is stored. It should be noted that peer information can also be configured manually, for example, by a network administrator.

In addition to identifying peer OSA-enabled users, it is typically necessary or desirable for each OSA-enabled user to authenticate its peers. Peer authentication is important because OSA operations can affect such things as the integrity of the ASON 120 and of the network as a whole. Therefore, the OSA typically includes peer authentication logic for authenticating peer OSA-enabled users. The peer authentication logic typically uses public or private key technologies for authentication, although the peer authentication logic is not limited to any particular peer authentication mechanism.

Figure 20:
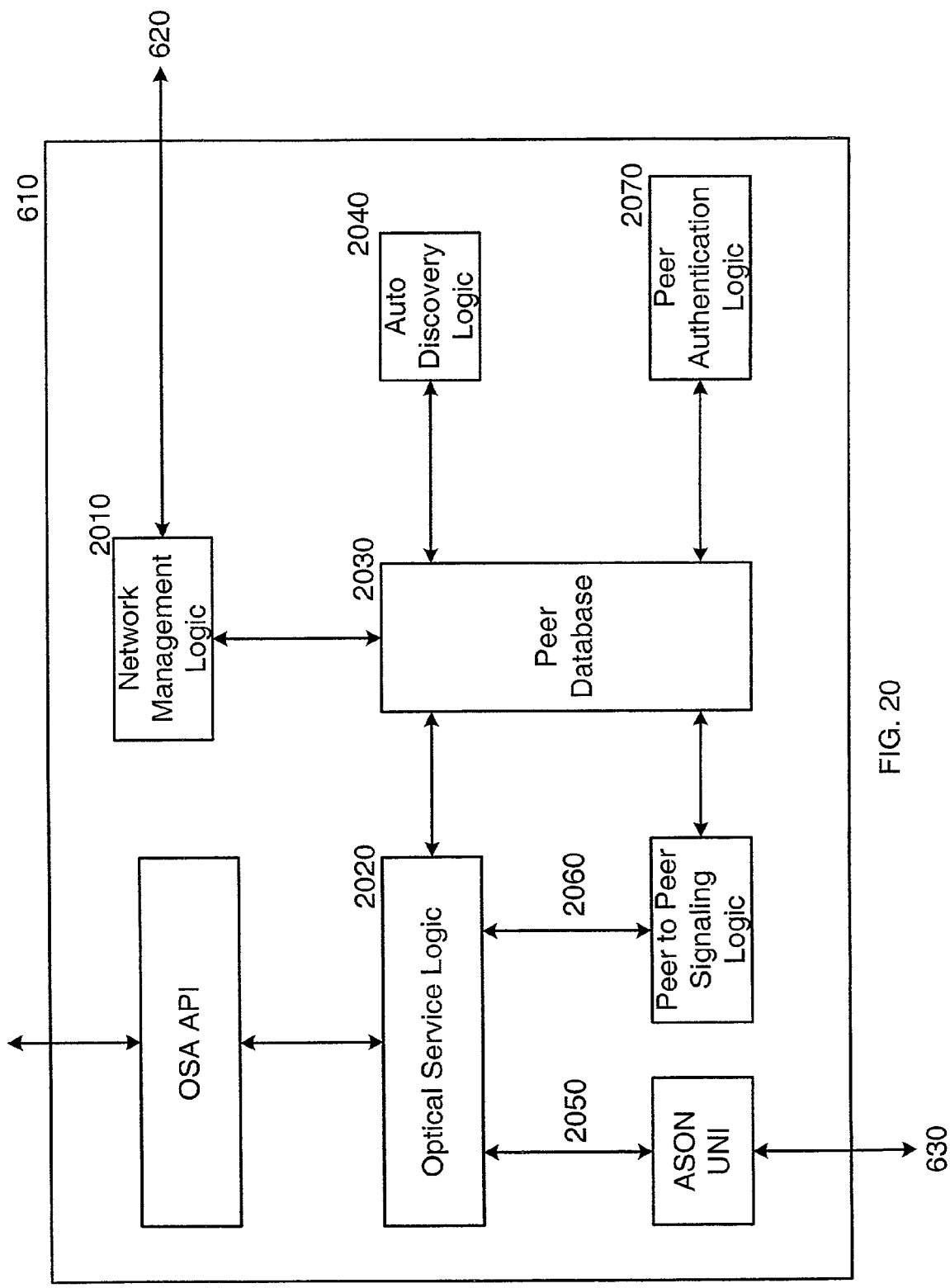
FIG. 20 is a block diagram showing relevant components of the OSA in accordance with an embodiment of the present invention.

FIG. 20 shows the relevant components of the OSA 610. Among other things, the OSA 610 includes network management logic 2010, optical service logic 2020, peer database 2030, auto-discovery logic 2040, ASON UNI 2050, peer-to-peer signaling logic 2060, and peer authentication logic 2070.

The network management logic 2010 provides for configuration and control of the OSA 610. Among other things, the network management logic 2010 interfaces with the network management/optimization elements 380 in the ASON device via the network management interface 620, and also enables remote control of the OSA 610 by a network administrator. For example, the network administrator can manually configure peer information in the peer database 2030 via the network management logic 2010.

The optical service logic 2020 implements application-specific services and intelligence. The optical service logic 202 interacts with the ASON 120 via the ASON UNI 2050. The optical service logic 2020 also interacts with other OSA-enabled users via the peer-to-peer signaling logic 2060. The optical service logic 2020 may utilize peer information stored in the peer database 2030.

The peer-to-peer signaling logic 2060 enables the OSA-enabled user to communicate with other OSA-enabled users within a user network and/or across the ASON 120. Among other things, the peer-to-peer signaling mechanism effectively extends OSA functionality to OSA-enabled users that are not at the edge of the ASON 120. The peer-to-peer signaling logic 2060 may utilize peer information stored in the peer database 2030.

The auto-discovery logic 2040 enables the OSA-enabled user to automatically discover peer OSA-enabled users within a user network and/or across the ASON 120. The auto-discovery logic 2040 typically uses an advertisement mechanism for exchanging peer information between OSA-enabled users, similar to the exchanging of link state advertisements by OSPF, although the auto-discovery logic 2040 is not limited to any particular advertisement or discovery mechanism. The auto-discover logic 2040 stores peer information in the peer database 2030.

The peer authentication logic 2070 enables the OSA-enabled user to authenticate peer OSA-enabled users. Peer authentication is important because OSA operations can affect such things as the integrity of the ASON 120 and of the network as a whole. The peer authentication logic 2070 typically uses public or private key technologies for authentication, although the peer authentication logic 2070 is not limited to any particular peer authentication mechanism. The peer authentication logic 2070 may utilize and store peer information in the peer database 2030.

Figure 21:
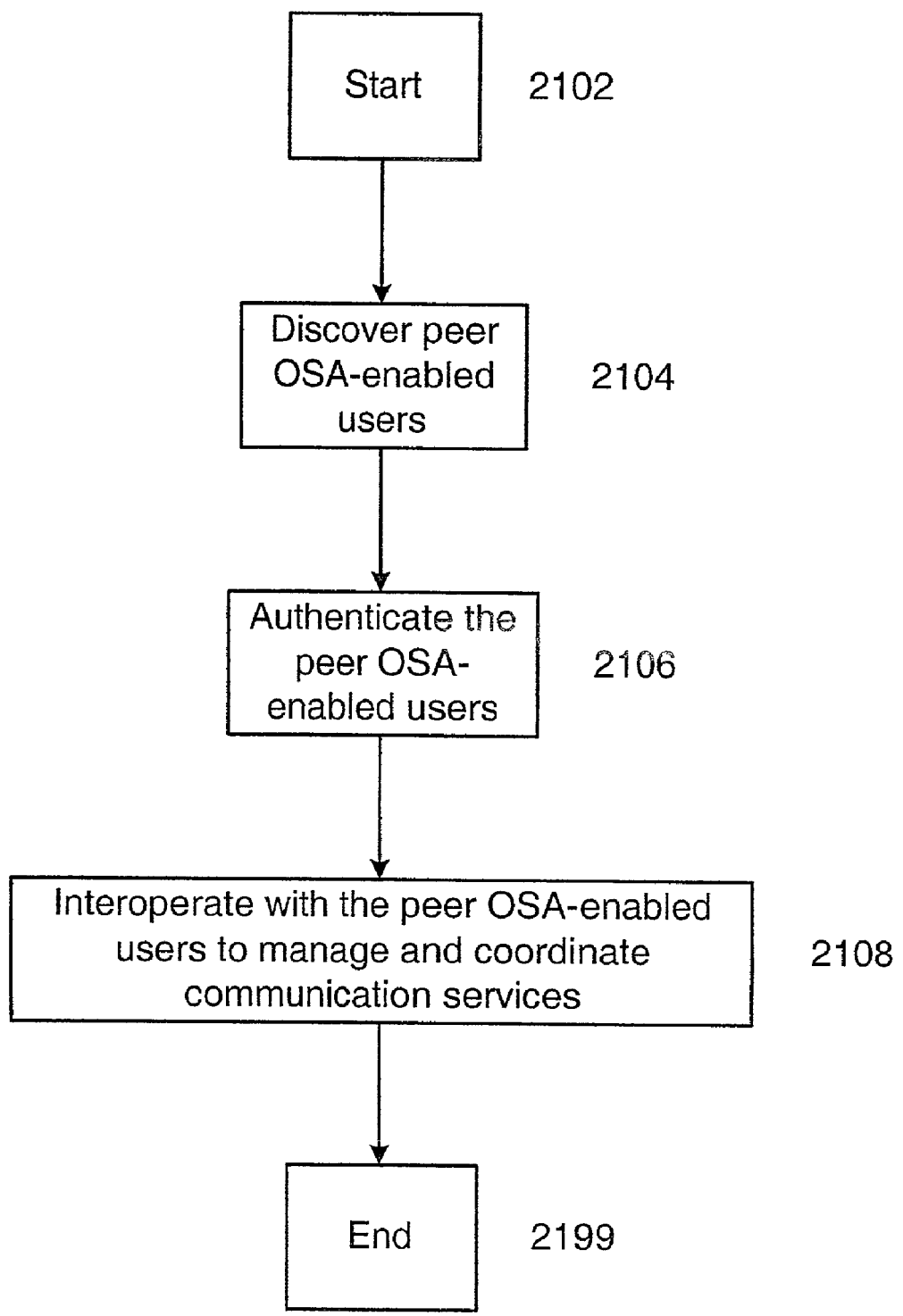
FIG. 21 is a logic flow diagram showing exemplary OSA logic for managing communication services in accordance with an embodiment of the present invention.

FIG. 21 shows exemplary OSA logic 2100 for managing communication services. Beginning at block 2102, the logic discovers peer OSA-enabled users using a predetermined auto-discovery mechanism, in block 2104. The logic authenticates the peer OSA-enabled users using a predetermined peer authentication mechanism, in block 2106. The logic then interoperates with the peer OSA-enabled users to manage and coordinate communication services, in block 2108. The logic 2100 terminates in block 2199.

In an exemplary embodiment of the present invention, an authenticated auto-discovery mechanism combining both auto-discovery and peer authentication is used to automatically identify and authenticate peer OSA-enabled users. The authenticated auto-discovery mechanism requires each OSA-enabled user to register with the ASON using an authenticated registration mechanism. A centralized advertisement scheme managed by the OSS is used to collect and distribute peer information to the peer OSA-enabled users associated with a particular peer group. Each OSA-enabled user maintains the peer information received from the OSS in its peer database.

More specifically, when an OSA-enabled user needs to access the ASON, it first establishes and activates the ASON UNI with a corresponding ASON device at the edge of the ASON. The OSA-enabled user then registers with the ASON by sending a registration message to the ASON edge device. The registration message includes, among other things, a group identifier identifying the peer group for the OSA-enabled user.

Upon receiving the registration message from the OSA-enabled user, the ASON edge device sends a challenge message to the OSA-enabled user. The challenge message provides an opportunity for the OSA-enabled user to positively identify itself to the ASON through a cryptographic authentication mechanism, for example, using predetermined public and/or private key technologies.

Upon receiving the challenge message from the ASON edge device, the OSA-enabled user formats a challenge response message. The challenge response message positively identifies itself to the ASON device using the cryptographic authentication message. The OSA-enabled user sends the challenge response message to the ASON edge device.

Upon receiving the challenge response message from the OSA-enabled user, the ASON edge device authenticates the information in the challenge response message to verify and positively identify the OSA-enabled user. This authentication may require interaction with other network elements, such as a certifying authority for public key authentication or retrieval of an encryption key from a secure server (possibly the OSS) for private key authentication. If the ASON edge device is able to verify and positively identify the OSA-enabled user through the information provided in the challenge response message, then the ASON edge device sends a success message to the OSA-enabled user indicating that the registration process is complete. On the other hand, if the ASON edge device is unable to verify and positively identify the OSA-enabled user through the information provided in the challenge response message, then the ASON edge device rejects the registration, for example, by sending a rejection message to the OSA-enabled user.

Upon successfully registering the OSA-enabled user, the ASON edge device also sends a join message to the OSS in order to add the OSA-enabled user to its peer group. The join message includes, among other things, a group identifier identifying the peer group, a user identifier identifying the OSA-enabled user, and a bearer identifier identifying the bearer channel associated with the OSA-enabled user.

The OSS maintains group membership information for the various OSA-enabled users that have registered with the ASON. Upon receiving the join message from the ASON edge device, the OSS stores the group membership information for the new OSA-enabled user identified in the join message. If the new OSA-enabled user is the first to register for the particular peer group, then the OSS sends a database synchronization message to the ASON edge device listing no peer OSA-enabled users (i.e., a NULL list). However, if the new OSA-enabled user is not the first to register for the particular peer group, then the OSS sends a database synchronization message to the ASON edge device listing the other peer OSA-enabled users, and also sends an advertisement message to the various ASON devices supporting registered OSA-enabled users listing at least the new OSA-enabled user.

Upon receiving the database synchronization message from the OSS, the ASON edge device determines whether any peer OSA-enabled users are listed in the database synchronization message. If there is at least one peer OSA-enabled user listed in the database synchronization message, then the ASON edge device sends a new neighbor message to the OSA-enabled user listing the peer OSA-enabled users and their respective bearer identifiers. However, if there are no peer OSA-enabled users listed in the database synchronization message (i.e., the list is NULL), then the ASON edge device typically does not send the new neighbor message to the OSA-enabled user, since the peer database maintained by the OSA-enabled user is NULL by default.

Each ASON device that receives an advertisement message from the OSS sends a new neighbor message to its respective OSA-enabled user including the list of peer OSA-enabled users from the advertisement message. The new neighbor message identifies the new OSA-enabled user to all existing OSA-enabled users in the peer group.

Upon receiving a new neighbor message from its corresponding ASON device, an OSA-enabled user stores the peer information from the new neighbor message in its peer database.

Thereafter, whenever a new OSA-enabled user registers with the peer group, the OSS sends an advertisement message to those ASON devices that support registered OSA-enabled devices in the peer group. The advertisement message identifies at least the new OSA-enabled user and its bearer identifier, and may also list some or all of the other peer OSA-enabled users and their respective bearer identifiers. Each ASON device that receives an advertisement message from the OSS sends a new neighbor message to its respective OSA-enabled user listing the peer OSA-enabled users and their respective bearer identifiers. Each OSA-enabled user that receives a new neighbor message from its corresponding ASON device stores the peer information in its peer database.

Figure 22:
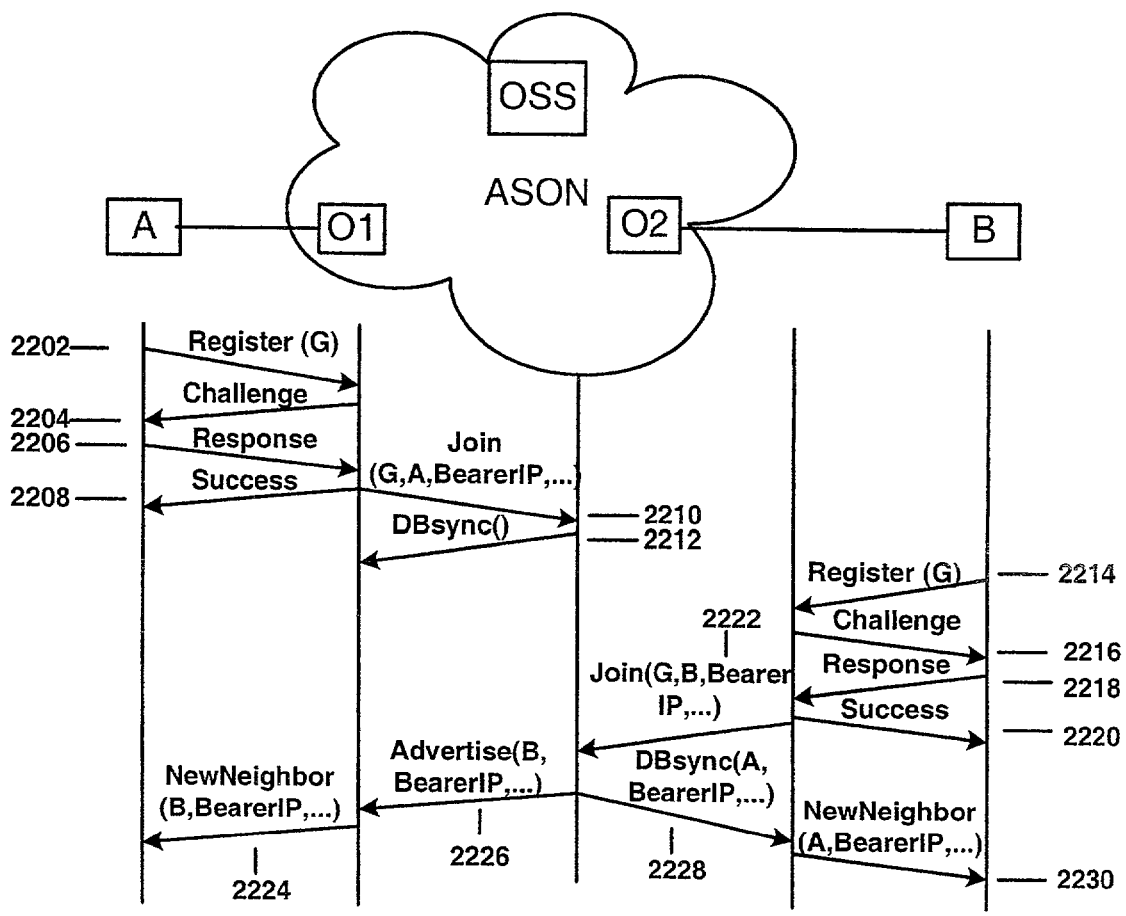
FIG. 22 is a message flow diagram demonstrating an authenticated auto-discovery process in accordance with an embodiment of the present invention.

FIG. 22 is a message flow diagram demonstrating the authenticated auto-discovery process between an OSA-enabled user A and an OSA-enabled user B. The OSA-enabled user A accesses the ASON through ASON device O1. The OSA-enabled user B accesses the ASON through ASON device O2. In this example, it is assumed that the OSA-enabled user A is the first to register for the peer group G, and the OSA-enabled user B is the second to register for the peer group G.

In order to register with the ASON, the OSA-enabled user A sends registration message 2202 to the ASON device O1 indicating peer group G. The ASON device O1 sends challenge message 2204 to the OSA-enabled user A. The OSA-enabled user A sends challenge response message 2206 to the ASON device O1. The ASON device O1 sends success message 2208 to the OSA-enabled user A, and also sends join message 2210 to the OSS including group identifier for peer group G, user identifier for OSA-enabled user A, and bearer identifier for the bearer channel to OSA-enabled user A. The OSS sends database synchronization (DBsync) message 2212 to the ASON device O1 with a NULL list of peer OSA-enabled users. The ASON device O1 does not send a new neighbor message to the OSA-enabled user A.

In order to register with the ASON, the OSA-enabled user B sends registration message 2214 to the ASON device O2 indicating peer group G. The ASON device O2 sends challenge message 2216 to the OSA-enabled user B. The OSA-enabled user B sends challenge response message 2218 to the ASON device O2. The ASON device O2 sends success message 2220 to the OSA-enabled user B, and also sends join message 2222 to the OSS including group identifier for peer group G, user identifier for OSA-enabled user B, and bearer identifier for the bearer channel to OSA-enabled user B. The OSS sends database synchronization (DBsync) message 2228 to the ASON device O2 with listing OSA-enabled user A as a peer OSA-enabled user, and also sends advertisement message 2226 to the ASON device O1 indicating OSA-enabled user B as a new peer OSA-enabled user. The ASON device O1 sends new neighbor message 2224 to the OSA-enabled user A including peer information for OSA-enabled user B, and the OSA-enabled user A adds OSA-enabled user B to its peer database. The ASON device O2 sends new neighbor message 2230 to the OSA-enabled user B including peer information for OSA-enabled user A, and the OSA-enabled user B adds OSA-enabled user A to its peer database. At this point, the OSA-enabled user A has successfully identified and authenticated the OSA-enabled user B, and the OSA-enabled user B has successfully identified and authenticated the OSA-enabled user A.

Each ASON device monitors the connection to its corresponding OSA-enabled user. If the ASON device detects loss or degradation of the connection to the OSA-enabled user (e.g., due to a failure of the ASON UNI, the bearer channel, or the OSA-enabled device itself), then the ASON device sends a leave message to the OSS to remove the OSA-enabled user from the peer group. The OSS removes the OSA-enabled user from the peer group, and sends an advertisement message to the various ASON devices that support registered OSA-enabled users indicating the removed OSA-enabled users. Each ASON device in turn sends an update message to its corresponding OSA-enabled user indicating the removed OSA-enabled user. Each OSA-enabled user deletes the removed OSA-enabled user from its respective peer database.

Figure 23:
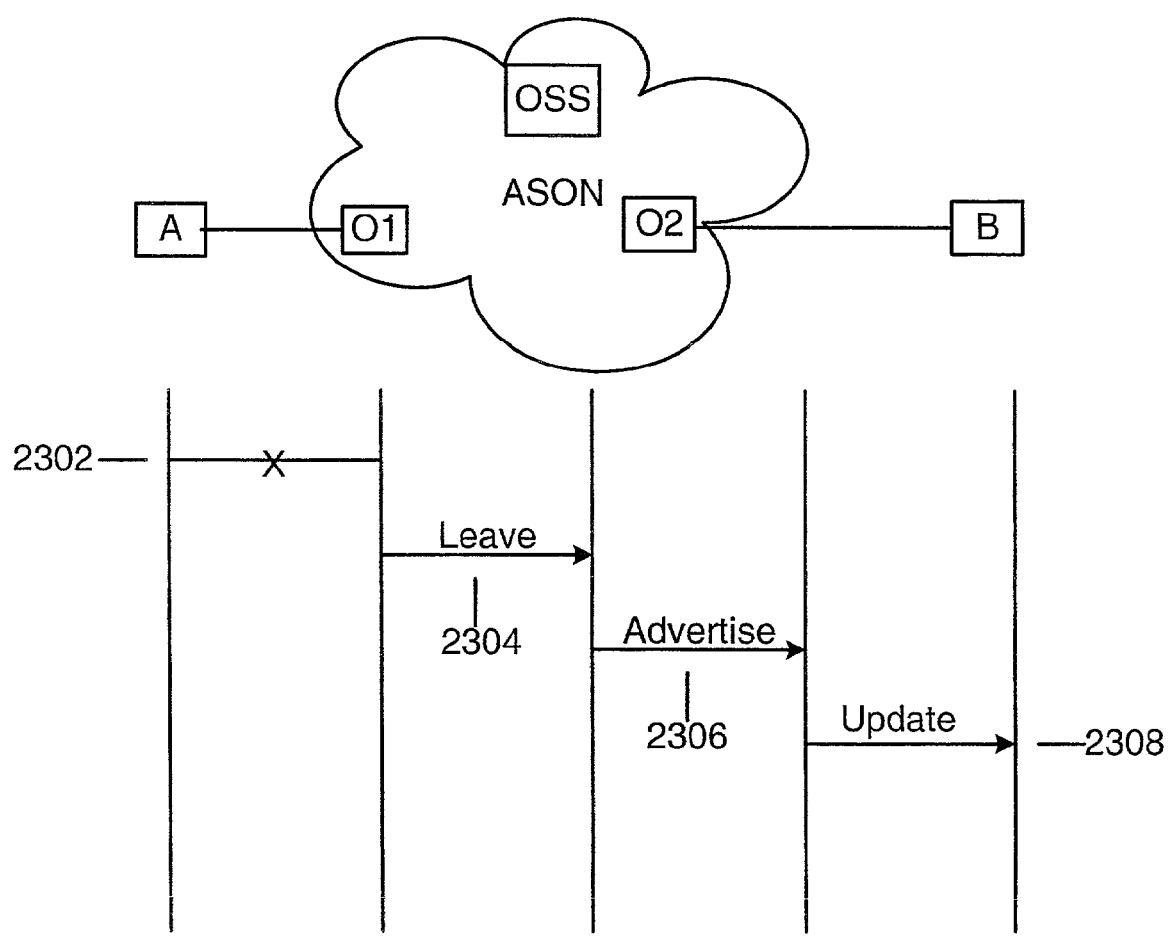
FIG. 23 is a message flow diagram demonstrating the process of removing an OSA-enabled user from a peer group in accordance with an embodiment of the present invention.

FIG. 23 is a message flow diagram demonstrating the process of removing an OSA-enabled user from a peer group. Upon detecting loss or degradation of the connection to the OSA-enabled user, as represented by 2302, the ASON device O1 sends leave message 2304 to the OSS. The OSS removes the OSA-enabled device A from the peer group, and sends advertisement message 2306 to the ASON device O2. The ASON device O2 sends update message 2308 to the OSA-enabled user B indicating that the OSA-enabled user A is no longer a member of the peer group, and the OSA-enabled user B removes the OSA-enabled user A from its peer database.

It should be noted that, when an OSA-enabled user interoperates with an ASON-enabled user, as shown and described with reference to FIG. 18 above, there is essentially no peer-to-peer relationship between the OSA-enabled user and the ASON-enabled user. Consequently, many of the OSA's peer-to-peer mechanisms are not available for interoperation between the OSA-enabled user and the ASON-enabled user. Specifically, the ASON-enabled user does not support OSA auto-discovery, peer authentication, and peer-to-peer signaling mechanisms. Therefore, the OSA-enabled user typically cannot auto-discover, authenticate, and perform peer-to-peer signaling with the ASON-enabled user. This has certain practical implications. For example, an ASON-enabled user receiving a request from an OSA-enabled user would be unable to authenticate the OSA-enabled user, and therefore would generally have to accept the request unconditionally. This poses a security/reliability risk that may be unacceptable in some situations.

It should also be noted that optical communication services may be provided by multiple service and infrastructure providers. The OSA can manage communication services provided by these multiple service and infrastructure providers.

As discussed above, the OSA is an intelligent agent that manages various communication services on behalf of the network user. The OSA interacts with the ASON to obtain various communication services, and manages those services for the network user based upon predetermined parameters defined by the network user. The OSA can manage practically any communication services that have heretofore been managed manually. Some of the many communication services that can be managed by the OSA are described in the related applications that were incorporated by reference above.

It should be noted that the term "router" is used herein to describe a communication device that may be used in a communication system, and should not be construed to limit the present invention to any particular communication device type. Thus, a communication device may include, without limitation, a bridge, router, bridge-router (brouter), switch, node, or other communication device.

It should also be noted that the term "packet" is used herein to describe a communication message that may be used by a communication device (e.g., created, transmitted, received, stored, or processed by the communication device) or conveyed by a communication medium, and should not be construed to limit the present invention to any particular communication message type, communication message format, or communication protocol. Thus, a communication message may include, without limitation, a frame, packet, datagram, user datagram, cell, or other type of communication message.

It should also be noted that the logic flow diagrams are used herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Often times, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. In a typical embodiment of the present invention, predominantly all of the OSA logic is implemented as a set of computer program instructions that is converted into a computer executable form, stored as such in a computer readable medium, and executed by a microprocessor within the OSA-enabled user under the control of an operating system.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

The present invention may be embodied in other specific forms without departing from the true scope of the invention. The described embodiments are to be considered in all respects only as illustrative and not restrictive.

What is claimed is:

1. A computer program product including an optical service agent stored on a non-transitory computer-readable medium for managing communication services for a user in an optical communication system in which the user lacks at least some network information related to the services, comprising:
    a user-to-network interface (UNI) for interfacing with an optical communication network, including signaling to a network device having network information related to the communication services, including network topological information, to cause the network device to signal an indication of group membership to other devices in communication with the optical communication network; and
    optical service logic for obtaining a new optical communication path from the optical communication network via the network device by signaling through the UNI, the network device selecting the communication path based at least in-part on user network or application requirements and the network information related to the communication services and managing said optical communication path for the user without exposing the network topological information to the user,
    whereby the user need not have the network topological information in order to obtain a new optical communication path.

2. The computer program product of claim 1, wherein the optical communication network comprises an automatically switched optical/transport network (ASON), and wherein the UNI comprises an ASON UNI.

3. The computer program product of claim 1, further comprising auto-discovery logic for automatically discovering peer users.

4. The computer program product of claim 3, wherein the auto-discovery logic comprises an advertisement mechanism for sending and receiving peer information.

5. The computer program product of claim 4, further comprising a peer database for storing peer information.

6. The computer program product of claim 1, further comprising peer authentication logic for authenticating peer users.

7. The computer program product of claim 1, further comprising peer-to-peer signaling logic for communicating with peer users.

8. The computer program product of claim 7, wherein the optical service logic coordinates communication services with peer users via the peer-to-peer signaling logic.

9. The computer program product of claim 1, wherein the optical service agent comprises an application component and a network component.

10. The computer program product of claim 9, wherein the application component and the network component are situated within the user, and wherein the network component implements the UNI for interfacing with the optical communication network.

11. The computer program product of claim 9, wherein the application component is situated within the user and the network component is situated within the optical communication network, and wherein the application component and the network component communicate via the UNI.

12. The computer program product of claim 9, wherein the application component and the network component communicate via a control interface, and wherein the network component interfaces with the optical communication network via the UNI as a proxy for the application component.

13. The computer program product of claim 1, further comprising an application program interface (API) for interfacing with a user application.

14. A device comprising:
a user application stored on a non-transitory computer-readable medium and executable by a computer, the user application requiring a new communication path from an optical communication network; and
an optical service agent stored on a non-transitory computer-readable medium and executable by a computer, the optical service agent for obtaining the new optical communication path from a network device associated with the optical communication network via a user-to-network interface (UNI), the network device being operable to manage said optical communication path for the user application and including network information related to communication paths, including network topological information, and optical service logic for obtaining new optical communication paths from the optical communication network in response to signaling from the optical service agent via the UNI based at least in-part on user network or application requirements and the network information related to the communication paths, and without exposing the network topological information to the user, whereby the user need not have the network topological information in order to obtain a new optical communication path.

15. The device of claim 14, wherein the optical communication network comprises an automatically switched optical/transport network (ASON), and wherein the UNI comprises an ASON UNI.

16. The device of claim 14, wherein the optical service agent comprises auto-discovery logic for automatically discovering peer users.

17. The device of claim 16, wherein the auto-discovery logic comprises an advertisement mechanism for sending and receiving peer information.

18. The device of claim 14, wherein the optical service agent comprises a peer database for storing peer information.

19. The device of claim 14, wherein the optical service agent comprises peer authentication logic for authenticating peer users.

20. The device of claim 14, wherein the optical service agent comprises peer-to-peer signaling logic for communicating with peer users.

21. The device of claim 20, wherein the optical service agent coordinates communication services with peer users via the peer-to-peer signaling logic.

22. The device of claim 14, wherein the optical service agent comprises an application component and a network component, and wherein the network component implements the UNI for interfacing with the optical communication network.

23. The device of claim 14, wherein the optical service agent comprises an application component that communicates with a peer network component in the optical communication network via the UNI.

24. The device of claim 14, wherein the optical service agent comprises an application component that communicates with a network component via a control interface, and wherein the network component interfaces with the optical communication network via the UNI as a proxy for the application component.

25. The device of claim 14, wherein the optical service agent comprises an application program interface (API) for interfacing with the user application.

26. Apparatus for use in optical communication network, comprising:
a controller for providing optical communication services: and
an optical service agent stored on a non-transitory computer-readable medium and executable by a computer, the optical service agent for obtaining a new optical communication path from the controller, wherein the controller is operable to manage said optical communication path for a network user and includes network information related to communication paths, including network topological information, and wherein the controller is operable in response to signaling from the optical service agent to obtain new optical communication paths from the optical communication network based at least in-part on user network or application requirements and the network information related to the communication paths, and without exposing the network topological information to the user, whereby the user need not have the network topological information in order to obtain a new optical communication path.

27. The apparatus of claim 26, wherein the optical service agent implements a user-to-network interface (UNI) for interfacing with the controller.

28. The apparatus of claim 27, wherein the optical communication network comprises an automatically switched optical/transport network (ASON), and wherein the UNI comprises an ASON UNI.

29. A system comprising:
an optical communication network: and
a first network user coupled to the optical communication network, wherein the first network user comprises an optical service agent stored on a non-transitory computer-readable medium and executable by a computer, the optical service agent for obtaining new optical communication paths from the optical communication network via a network device through a user-to-network interface (UNI), the network device managing the optical communication paths for the first network user, and including network information related to communication paths, including network topological information, and optical service logic operable in response to signaling from the optical service agent for obtaining new optical communication paths from the optical communication network based at least in-part on user network or application requirements and the network information related to the communication paths, and without exposing the network topological information to the user, whereby the user need not have the network topological information in order to obtain a new optical communication path.

30. The system of claim 29, wherein the optical communication network comprises an automatically switched optical/transport network (ASON), and wherein the UNI comprises an ASON UNI.

31. The system of claim 29, wherein the optical service agent comprises an application component and a network component, and the network component implements the UNI for interfacing with the optical communication network.

32. The system of claim 29, wherein the optical service agent comprises an application component and the optical communication network comprises network component, and wherein the application component and the network component communicate via the UNI.

33. The system of claim 29, further comprising a network component, wherein the optical service agent comprises an application component that communicates with the network component via a control interface, and wherein the network component interfaces with the optical communication network via the UNI as a proxy for the application component.

34. The system of claim 29, further comprising a second network user coupled to the optical communication network, said second network user comprising a second optical service agent.

35. The system of claim 34, wherein each of said optical service agents comprises auto-discovery logic for automatically discovering the other of said optical service agents.

36. The system of claim 34, wherein each of said optical service agents comprises peer authentication logic for authenticating the other of said optical service agents.

37. The system of claim 34, wherein each of said optical service agents comprises peer-to-peer signaling logic for coordinating communication services with the other of said optical service agents.

38. The system of claim 29, further comprising a second network user coupled to the optical communication network, said second network user excluding an optical service agent.

* * * * *